(12) United States Patent
Geiger et al.

(10) Patent No.: US 7,873,227 B2
(45) Date of Patent: Jan. 18, 2011

(54) DEVICE AND METHOD FOR PROCESSING AT LEAST TWO INPUT VALUES

(75) Inventors: Ralf Geiger, Ilmenau (DE); Gerald Schuller, Erfurt (DE); Thomas Sporer, Furth (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 1339 days.

(21) Appl. No.: 11/386,077

(22) Filed: Mar. 20, 2006

(65) Prior Publication Data

US 2007/0196022 A1 Aug. 23, 2007

Related U.S. Application Data

(63) Continuation of application No. PCT/EP2004/010855, filed on Sep. 28, 2004.

(30) Foreign Application Priority Data

Oct. 2, 2003 (DE) ................................ 103 45 996

(51) Int. Cl.
*G06K 9/36* (2006.01)
*G06K 9/46* (2006.01)
(52) U.S. Cl. ........................ 382/248; 382/236
(58) Field of Classification Search .......... 382/232, 382/236, 248, 250, 252; 704/500–504; 708/400, 708/402; 375/240.18–240.2
See application file for complete search history.

(56) References Cited

U.S. PATENT DOCUMENTS

| 2003/0108248 | A1 | 6/2003 | Huang et al. |
| 2004/0220805 | A1 | 11/2004 | Geiger et al. |
| 2007/0276893 | A1* | 11/2007 | Huang et al. ................ 708/400 |

FOREIGN PATENT DOCUMENTS

| DE | 101 29 240 | 6/2001 |
| JP | 2006530034 | 8/2006 |
| WO | WO 02/103684 | 12/2002 |
| WO | WO 2005/031595 | 4/2005 |
| WO | WO 2005/034088 | 4/2005 |

OTHER PUBLICATIONS

Hao et al. ("Matrix factorizations for reversible integer mapping," IEEE Tran. Signal Processing, vol. 49, No. 10, Oct. 2001, pp. 2314-2324).*

(Continued)

*Primary Examiner*—Yubin Hung
(74) *Attorney, Agent, or Firm*—Thomas, Kayden, Horstemeyer & Risley, LLP

(57) ABSTRACT

For the reduction of the rounding error, a first and a second non-integer input value are provided and combined, for example by addition, in non-integer state to obtain a non-integer result value which is rounded and added to a third input value. Thus, the rounding error may be reduced at an interface between two rotations divided into lifting steps or between a first rotation divided into lifting steps and a first lifting step of a subsequent multi-dimensional lifting sequence.

11 Claims, 16 Drawing Sheets

OTHER PUBLICATIONS

Adams ("Generalized reversible integer-to-integer transform framework," IEEE conference on Communications, Computers and Signal Processing, Aug. 28-30, 2003, vol. 2, pp. 569-572).*

Przelaskowski ("Effective integer-to-integer transform for JPEG2000 coder," Proceedings of SPIE, vol. 4478 (2001), pp. 299-310).*

Wohlberg et al. ("Reversible integer-to-integer transforms and symmetric extension of even-length filter banks," Proceedings of SPIE, vol. 5150 (2003), pp. 1709-1718).*

Notification of Reasons for Rejection, Japanese Patent Offce, dated Sep. 9, 2008.

Geiger, et al., "Fine Grain Scalable Perceptual and Lossless Audio Coding Based on IntMDCT, Acoustics, Speech, and Signal Processing," 2003 IEEE International Conference on IEEE, Apr. 6, 2003, vol. 5, pp. 445-448.

Shunpei, et al., "A New Multistage Decomposition of Wavelet Transform for Lossless/Lossy Signal Compression," The Institution of Electronics, Information and Communication Engineers Technical Report, Jan. 223, 2002, v. 101, pp. 143-148.

Y. Zeng, G. Bi, and Z. Lin; "Integer Sinusoidal Transforms Based on Lifting Factorization;" pp. 1-4.

I. Daubechies and W. Sweldens; "Factoring Wavelet Transforms into Lifting Steps;" Sep. 1996; pp. 1-27.

J. Herre and J. Johnston; Enhancing the Performance of Perceptual Audio Coders by Using Temporal Noise Shaping (TNS); Nov. 1996; pp. 1-24.

R. Geiger and G. Schuller; "Integer Low Delay and MDCT Filter Banks;" 2002; pp. 811-815.

R. Geiger, T. Sporer, J. Koller, and K. Brandenburg; "Audio Coding Based on Integer Transforms;" Sep. 2001; pp. 1-9.

R. Geiger, J. Herre, J. Koller, and K. Brandenburg; "INTMDCT-A Link Between Perceptual and Lossless Audio Coding;" 2002; pp. 1813-1816.

J. Liang; "Fast Multipliers Approximations of the DCT with the Lifting Scheme;" Dec. 2001; pp. 3032-3044.

R. Geiger, T. Sporer, J. Koller, and K. Brandenburg; "Audio Coding Based on Integer Transforms;" Sep. 2001; pp. 1-8.

P.P. Vaidyanathan; "Multirate Systems and Filter Banks;" Prentice Hall, Englewood Cliffs, 1993; pp. 47-51.

H.S. Malvar; Signal Processing with Lapped Transforms; Artech House, 1992; pp. 745-751.

U. Zoelzer; "Digitale Audiosignalverarbeitung;" Teubner-Verlag, Stuttgart 1997; pp. 19-21.

Chinese language Notice of Allowance dated Jun. 9, 2009.

* cited by examiner $$Y(z) = X(z) + (1 - z^{-1} \cdot H(z)) \cdot E(z)$$

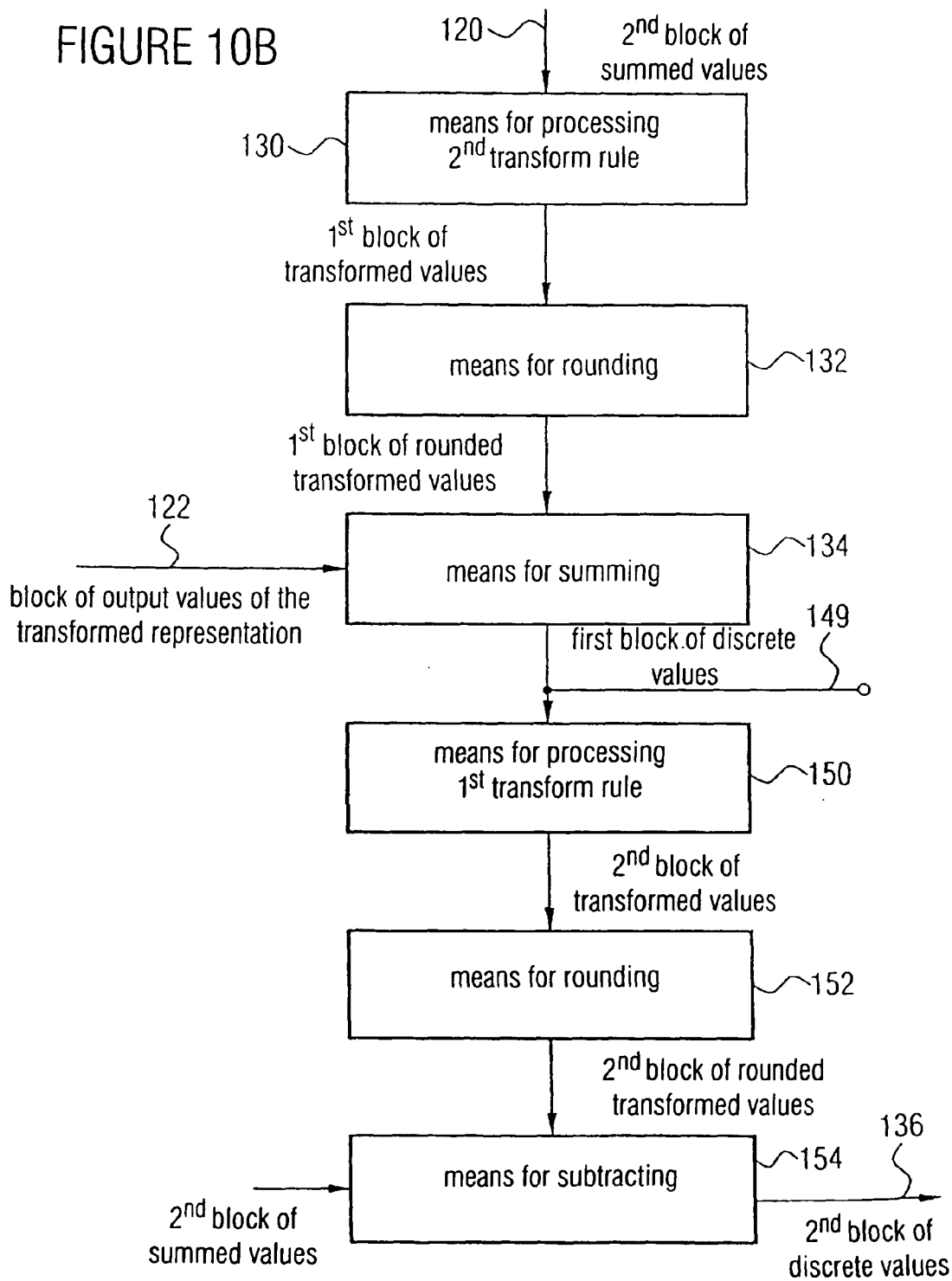

lifting step with transform matrix in converting inverse lifting step with transform matrix in inverse converting

DEVICE AND METHOD FOR PROCESSING AT LEAST TWO INPUT VALUES

CROSS-REFERENCE TO RELATED APPLICATION

This application is a continuation of copending International Application No. PCT/EP2004/010855, filed on Sep. 28, 2004, which designated the United States and was not published in English.

BACKGROUND OF THE INVENTION

1. Field of the Invention

The present invention relates to signal processing and particularly to signal processing of sequential values, such as audio samples or video samples, which are particularly suitable especially for lossless coding applications.

2. Description of the Related Art

The present invention is further suitable for compression algorithms for discrete values comprising audio and/or image information, and particularly for coding algorithms including a transform in the frequency domain or time domain or location domain, which are followed by a coding, such as an entropy coding in the form of a Huffman or arithmetic coding.

Modern audio coding methods, such as MPEG Layer3 (MP3) or MPEG AAC, use transforms, such as the so-called modified discrete cosine transform (MDCT), to obtain a block-wise frequency representation of an audio signal. Such an audio coder usually obtains a stream of time-discrete audio samples. The stream of audio samples is windowed to obtain a windowed block of for example 1,024 or 2,048 windowed audio samples. For the windowing, various window functions are employed, such as a sine window, etc.

The windowed time-discrete audio samples are then converted to a spectral representation by means of a filter bank. In principle, a Fourier transform or, for special reasons, a variety of the Fourier transform, such as an FFT or, as discussed, an MDCT, may be employed for this. The block of audio spectral values at the output of the filter bank may then be processed further, as necessary. In the above audio coders, a quantization of the audio spectral values follows, wherein the quantization stages are typically chosen so that the quantization noise introduced by the quantizing is below the psychoacoustic masking threshold, i.e. is "masked away". The quantization is a lossy coding. In order to obtain further data amount reduction, the quantized spectral values are then entropy-coded, for example by means of Huffman coding. By adding side information, such as scale factors etc., a bit stream, which may be stored or transmitted, is formed from the entropy-coded quantized spectral values by means of a bit stream multiplexer.

In the audio decoder, the bit stream is split up into coded quantized spectral values and side information by means of a bit stream demultiplexer. The entropy-coded quantized spectral values are first entropy-decoded to obtain the quantized spectral values. The quantized spectral values are then inversely quantized to obtain decoded spectral values comprising quantization noise, which, however, is below the psychoacoustic masking threshold and will thus be inaudible. These spectral values are then converted to a temporal representation by means of a synthesis filter bank to obtain time-discrete decoded audio samples. In the synthesis filter bank, a transform algorithm inverse to the transform algorithm has to be employed. Moreover, the windowing has to be reversed after the frequency-time backward transform.

In order to achieve good frequency selectivity, modern audio coders typically use block overlap. Such a case is illustrated in FIG. 6a. First for example 2,048 time-discrete audio samples are taken and windowed by means of means 402. The window embodying means 402 has a window length of 2N samples and provides a block of 2N windowed samples on the output side. In order to achieve a window overlap, a second block of 2N windowed samples is formed by means of means 404, which is illustrated separate from means 402 in FIG. 6a only for reasons of clarity. The 2,048 samples fed to means 404, however, are not the time-discrete audio samples immediately subsequent to the first window, but contain the second half of the samples windowed by means 402 and additionally contain only 1,024 "new" samples. The overlap is symbolically illustrated by means 406 in FIG. 6a, causing an overlapping degree of 50%. Both the 2N windowed samples output by means 402 and the 2N windowed samples output by means 404 are then subjected to the MDCT algorithm by means of means 408 and 410, respectively. Means 408 provides N spectral values for the first window according to the known MDCT algorithm, whereas means 410 also provides N spectral values, but for the second window, wherein there is an overlap of 50% between the first window and the second window.

In the decoder, the N spectral values of the first window, as shown in FIG. 6b, are fed to means 412 performing an inverse modified discrete cosine transform. The same applies to the N spectral values of the second window. They are fed to means 414 also performing an inverse modified discrete cosine transform. Both means 412 and means 414 each provide 2N samples for the first window and 2N samples for the second window, respectively.

In means 416, designated TDAC (time domain aliasing cancellation) in FIG. 6b, the fact is taken into account that the two windows are overlapping. In particular, a sample $y_1$ of the second half of the first window, i.e. with an index N+k, is summed with a sample $y_2$ from the first half of the second window, i.e. with an index k, so that N decoded temporal samples result on the output side, i.e. in the decoder.

It is to be noted that, by the function of means 416, which is also referred to as add function, the windowing performed in the coder schematically illustrated by FIG. 6a is taken into account somewhat automatically, so that no explicit "inverse windowing" has to take place in the decoder illustrated by FIG. 6b.

If the window function implemented by means 402 or 404 is designated w(k), wherein the index k represents the time index, the condition has to be met that the squared window weight w(k) added to the squared window weight w(N+k) together are 1, wherein k runs from 0 to N−1. If a sine window is used whose window weightings follow the first half-wave of the sine function, this condition is always met, since the square of the sine and the square of the cosine together result in the value 1 for each angle.

In the window method with subsequent MDCT function described in FIG. 6a, it is disadvantageous that the windowing by multiplication of a time-discrete sample, when thinking of a sine window, is achieved with a floating-point number, since the sine of an angle between 0 and 180 degrees does not yield an integer, apart from the angle of 90 degrees. Even when integer time-discrete samples are windowed, floating-point numbers result after the windowing.

Therefore, even if no psychoacoustic coder is used, i.e. if lossless coding is to be achieved, quantization will be necessary at the output of means 408 and 410, respectively, to be able to perform reasonably manageable entropy coding.

Generally, currently known integer transforms for lossless audio and/or video coding are obtained by a decomposition of the transforms used therein into Givens rotations and by applying the lifting scheme to each Givens rotation. Thus a rounding error is introduced in each step. For subsequent stages of Givens rotations, the rounding error continues to accumulate. The resulting approximation error becomes problematic particularly for lossless audio coding approaches, particularly when long transforms are used providing, for example, 1,024 spectral values, such as it is the case in the known MDCT with overlap and add (MDCT=modified discrete cosine transform). Particularly in the higher frequency range, where the audio signal typically has a very low energy amount anyway, the approximation error may quickly become larger than the actual signal, so that these approaches are problematic with respect to lossless coding and particularly with respect to the coding efficiency that may achieved by it.

With respect to the audio coding, integer transforms, i.e. transform algorithms generating integer output values, are particularly based on the known DCT-IV, which does not take into account a DC component, while integer transforms for image applications are rather based on the DCT-II, which especially contains the provisions for the DC component. Such integer transforms are, for example, known in Y. Zeng, G. Bi and Z. Lin, "Integer sinusoidal transforms based on lifting factorization", in Proc. ICASSP'01, May 2001, pp. 1,181-1,184, K. Komatsu and K. Sezaki, "Reversible Discrete Cosine Transform", in Proc. ICASSP, 1998, vol. 3, pp. 1,769-1,772, P. Hao and Q. Shi, "Matrix factorizations for reversible integer mapping", IEEE Trans. Signal Processing, Signal Processing, vol. 49, pp. 2,314-2,324, and J. Wang, J. Sun and S. Yu, "1-d and 2-d transforms from integers to integers", in Proc. ICASSP'03, Hongkong, April 2003.

As mentioned above, the integer transform described there are based on the decomposition of the transform into Givens rotations and on the application of the known lifting scheme to the Givens rotations, which results in the problem of the accumulating rounding errors. This is particularly due to the fact that, within a transform, roundings must be performed many times, i.e. after each lifting step, so that, particularly in long transforms causing a corresponding large number of lifting steps, there must be a particularly large number of roundings. As described, this results in an accumulated error and particularly also in a relatively complex processing, because rounding is performed after every lifting step to perform the next lifting step.

Subsequently, the decomposition of the MDCT windowing will be illustrated again with respect to FIGS. 9 to 11, as described in DE 10129240 A1, wherein this decomposition of the MDCT windowing into Givens rotations with lifting matrices and corresponding roundings is advantageously combinable with the concept discussed in FIG. 1 for the conversion and in FIG. 2 for the inverse conversion, to obtain a complete integer MDCT approximation, i.e. an integer MDCT (IntMDCT) according to the present invention, wherein both a forward and a backward transform concept are given for the example of an MDCT.

FIG. 3 shows an overview diagram for the inventive preferred device for processing time-discrete samples representing an audio signal to obtain integer values based on which the Int-MDCT integer transform algorithm is operative. The time-discrete samples are windowed by the device shown in FIG. 3 and optionally converted to a spectral representation. The time-discrete samples supplied to the device at an input 10 are windowed with a window w with a length corresponding to 2N time-discrete samples to achieve, at an output 12, integer windowed samples suitable to be converted to a spectral representation by means of a transform and particularly the means 14 for performing an integer DCT. The integer DCT is designed to generate N output values from N input values which is in contrast to the MDCT function 408 of FIG. 6a which only generates N spectral values from 2N windowed samples due to the MDCT equation.

For windowing the time-discrete samples, first two time-discrete samples are selected in means 16 which together represent a vector of time-discrete samples. A time-discrete sample selected by the means 16 is in the first quarter of the window. The other time-discrete sample is in the second quarter of the window, as discussed in more detail with respect to FIG. 5. The vector generated by the means 16 is now provided with a rotation matrix of the dimension 2×2, wherein this operation is not performed directly, but by means of several so-called lifting matrices.

A lifting matrix has the property to comprise only one element depending on the window w and being unequal to "1" or "0".

The factorization of wavelet transforms in lifting steps is presented in the specialist publication "Factoring Wavelet Transforms Into Lifting Steps", Ingrid Daubechies and Wim Sweldens, Preprint, Bell Laboratories, Lucent Technologies, 1996. Generally, a lifting scheme is a simple relation between perfectly reconstructing filter pairs having the same low-pass or high-pass filters. Each pair of complementary filters may be factorized into lifting steps. This applies particularly to Givens rotations. Consider the case in which the polyphase matrix is a Givens rotation. The following then applies:

$$\begin{pmatrix} \cos\alpha & -\sin\alpha \\ \sin\alpha & \cos\alpha \end{pmatrix} = \begin{pmatrix} 1 & \frac{\cos\alpha - 1}{\sin\alpha} \\ 0 & 1 \end{pmatrix} \begin{pmatrix} 1 & 0 \\ \sin\alpha & 1 \end{pmatrix} \begin{pmatrix} 1 & \frac{\cos\alpha - 1}{\sin\alpha} \\ 0 & 1 \end{pmatrix} \quad (1)$$

Each of the three lifting matrices on the right-hand side of the equal sign has the value "1" as main diagonal element. There is further, in each lifting matrix, a secondary diagonal element equal to 0 and a secondary diagonal element depending on the rotation angle α.

The vector is now multiplied by the third lifting matrix, i.e. the lifting matrix on the far right in the above equation, to obtain a first result vector. This is illustrated in FIG. 3 by means 18. Now the first result vector is rounded with any rounding function mapping the set of real numbers into the set of integers, as illustrated in FIG. 3 by means 20. At the output of the means 20, a rounded first result vector is obtained. The rounded first result vector is now supplied to means 22 for multiplying it by the central, i.e. second, lifting matrix to obtain a second result vector which is again rounded in means 24 to obtain a rounded second result vector. The rounded second result vector is now supplied to means 26 for multiplying it by the lifting matrix shown on the left in the above equation, i.e. the first one, to obtain a third result vector which is finally rounded by means of means 28 to finally obtain integer windowed samples at the output 12 which, if a spectral representation of the same is desired, now have to be processed by means 14 to obtain integer spectral values at a spectral output 30.

Preferably, the means 14 is implemented as integer DCT.

The discrete cosine transform according to type 4 (DCT-IV) with a length N is given by the following equation:

$$X_t(m) = \sqrt{\frac{2}{N}} \sum_{k=0}^{N-1} x(k)\cos\left(\frac{\pi}{4N}(2k+1)(2m+1)\right) \quad (2)$$

The coefficients of the DCT-IV form an orthonormal N×N matrix. Each orthogonal N×N matrix may be decomposed into N(N−1)/2 Givens rotations, as discussed in the specialist publication P. P. Vaidyanathan, "Multirate Systems And Filter Banks", Prentice Hall, Englewood Cliffs, 1993. It is to be noted that other decompositions also exist.

With respect to the classifications of the various DCT algorithms, see H. S. Malvar, "Signal Processing With Lapped Transforms", Artech House, 1992. Generally, the DCT algorithms differ in the kind of their basis functions. While the DCT-IV preferred herein includes non-symmetric basis functions, i.e. a cosine quarter wave, a cosine ¾ wave, a cosine 5/4 wave, a cosine 7/4 wave, etc., the discrete cosine transform of, for example, type II (DCT-II) has axisymmetric and point symmetric basis functions. The $0^{th}$ basis function has a DC component, the first basis function is half a cosine wave, the second basis function is a whole cosine wave, etc. Due to the fact that the DCT-II gives special emphasis to the DC component, it is used in video coding, but not in audio coding, because the DC component is not relevant in audio coding in contrast to video coding.

In the following, there will be a discussion how the rotation angle $\alpha$ of the Givens rotation depends on the window function.

An MDCT with a window length of 2N may be reduced to a discrete cosine transform of the type IV with a length N. This is achieved by explicitly performing the TDAC operation in the time domain and then applying the DCT-IV. In the case of a 50% overlap, the left half of the window for a block t overlaps with the right half of the preceding block, i.e. block t−1. The overlapping part of two consecutive blocks t−1 and t is preprocessed in the time domain, i.e. prior to the transform, as follows, i.e. it is processed between the input 10 and the output 12 of FIG. 3:

$$\begin{pmatrix} \tilde{x}_t(k) \\ \tilde{x}_{t-1}(N-1-k) \end{pmatrix} = \begin{pmatrix} w\left(\frac{N}{2}+k\right) & -w\left(\frac{N}{2}-1-k\right) \\ w\left(\frac{N}{2}-1-k\right) & w\left(\frac{N}{2}+k\right) \end{pmatrix} \begin{pmatrix} x_t\left(\frac{N}{2}+k\right) \\ x_t\left(\frac{N}{2}-1-k\right) \end{pmatrix} \quad (3)$$

The values marked with the tilde are the values at the output 12 of FIG. 3, while the x values not marked with a tilde in the above equation are the values at the input 10 and/or following the means 16 for selecting. The running index k runs from 0 to N/2−1, while w represents the window function.

From the TDAC condition for the window function w, the following applies:

$$w\left(\frac{N}{2}+k\right)^2 + w\left(\frac{N}{2}-1-k\right)^2 = 1 \quad (4)$$

For certain angles $\alpha_k$, k=0, ..., N/2−1, this preprocessing in the time domain may be written as Givens rotation, as discussed.

The angle $\alpha$ of the Givens rotation depends on the window function w as follows:

$$\alpha = \arctan[w(N/2-1-k)/w(N/2+k)] \quad (5)$$

It is to be noted that any window functions w may be employed as long as they fulfill this TDAC condition.

In the following, a cascaded coder and decoder are described with respect to FIG. 4. The time-discrete samples x(0) to x(2N−1), which are "windowed" together by a window, are first selected by the means 16 of FIG. 3 such that the sample x(0) and the sample x(N−1), i.e. a sample from the first quarter of the window and a sample from the second quarter of the window, are selected to form the vector at the output of the means 16. The crossing arrows schematically represent the lifting multiplications and subsequent roundings of the means 18, 20 and 22, 24 and 26, 28, respectively, to obtain the integer windowed samples at the input of the DCT-IV blocks.

When the first vector has been processed as described above, a second vector is further selected from the samples x(N/2−1) and x(N/2), i.e. again a sample from the first quarter of the window and a sample from the second quarter of the window, and is again processed by the algorithm described in FIG. 3. Analogously, all other sample pairs from the first and second quarters of the window are processed. The same processing is performed for the third and fourth quarters of the first window. Now there are 2N windowed integer samples at the output 12 which are now supplied to a DCT-IV transform as illustrated in FIG. 4. In particular, the integer windowed samples of the second and third quarters are supplied to a DCT. The windowed integer samples of the first quarter of the window are processed into a preceding DCT-IV together with the windowed integer samples of the fourth quarter of the preceding window. Analogously, in FIG. 4, the fourth quarter of the windowed integer samples is supplied to a DCT-IV transform together with the first quarter of the next window. The central integer DCT-IV transform 32 shown in FIG. 4 now provides N integer spectral values y(0) to y(N−1). These integer spectral values may now, for example, be simply entropy-coded without an interposed quantization being necessary, because the windowing and transform yield integer output values.

In the right half of FIG. 4, a decoder is illustrated. The decoder consisting of backward transform and "inverse windowing" operates inversely to the coder. It is known that an inverse DCT-IV may be used for the backward transform of a DCT-IV, as illustrated in FIG. 4. The output values of the decoder DCT-IV 34 are now inversely processed with the corresponding values of the preceding transform and/or the following transform, as illustrated in FIG. 4, in order to generate again time-discrete audio samples x(0) to x(2−N1) from the integer windowed samples at the output of the means 34 and/or the preceding and following transform.

The operation on the output side takes place by an inverse Givens rotation, i.e. such that the blocks 26, 28 and 22, 24 and 18, 20, respectively, are traversed in the opposite direction. This will be illustrated in more detail with respect to the second lifting matrix of equation 1. When (in the coder) the second result vector is formed by multiplication of the rounded first result vector by the second lifting matrix (means 22), the following expression results:

$$(x,y) \mapsto (x, y+x \sin \alpha) \quad (6)$$

The values x, y on the right-hand side of equation 6 are integers. This, however, does not apply to the value x sin α. Here, the rounding function r must be introduced, as illustrated in the following equation:

$$(x,y) \mapsto (x, y+r(x \sin \alpha)) \quad (7)$$

This operation is performed by the means 24.

The inverse mapping (in the decoder) is defined as follows:

$$(x',y') \mapsto (x', y'-r(x' \sin \alpha)) \quad (8)$$

Due to the minus sign in front of the rounding operation, it becomes apparent that the integer approximation of the lifting step may be reversed without introducing an error. The application of this approximation to each of the three lifting steps leads to an integer approximation of the Givens rotation. The rounded rotation (in the coder) may be reversed (in the decoder) without introducing an error by traversing the inverse rounded lifting steps in reverse order, i.e. if in decoding the algorithm of FIG. 3 is performed from bottom to top.

If the rounding function r is point symmetric, the inverse rounded rotation is identical to the rounded rotation with the angle −α and is expressed as follows:

$$\begin{pmatrix} \cos\alpha & \sin\alpha \\ -\sin\alpha & \cos\alpha \end{pmatrix} \quad (9)$$

The lifting matrices for the decoder, i.e. for the inverse Givens rotation, in this case result directly from equation (1) by merely replacing the expression "sin α" by the expression "−sin α".

In the following, the decomposition of a common MDCT with overlapping windows 40 to 46 is illustrated again with respect to FIG. 5. The windows 40 to 46 each have a 50% overlap. First, Givens rotations are performed per window within the first and second quarters of a window and/or within the third and fourth quarters of a window, as illustrated schematically by arrows 48. Then the rotated values, i.e. the windowed integer samples, are supplied to an N-to-N DCT such that always the second and third quarters of a window and the fourth and first quarters of a subsequent window, respectively, are converted to a spectral representation together by means of a DCT-IV algorithm.

The common Givens rotations are therefore decomposed into lifting matrices which are executed sequentially, wherein, after each lifting matrix multiplication, a rounding step is inserted such that the floating point numbers are rounded immediately after being generated such that, prior to each multiplication of a result vector with a lifting matrix, the result vector only has integers.

The output values thus always remain integer, wherein it is preferred to use also integer input values. This does not represent a limitation, because any exemplary PCM samples as they are stored on a CD are integer numerical values whose value range varies depending on bit width, i.e. depending on whether the time-discrete digital input values are 16-bit values or 24-bit values. Nevertheless, the whole process is invertible, as discussed above, by performing the inverse rotations in reverse order. There is thus an integer approximation of the MDCT with perfect reconstruction, i.e. a lossless transform.

The shown transform provides integer output values instead of floating point values. It provides a perfect reconstruction so that no error is introduced when a forward and then a backward transform are performed. According to a preferred embodiment of the present invention, the transform is a substitution for the modified discrete cosine transform. Other transform methods, however, may also be performed with integers as long as a decomposition into rotations and a decomposition of the rotations into lifting steps is possible.

The integer MDCT has most of the favorable properties of the MDCT. It has an overlapping structure, whereby a better frequency selectivity is obtained than with non-overlapping block transforms. Due to the TDAC function which is already taken into account in windowing prior to the transform, a critical sampling is maintained so that the total number of spectral values representing an audio signal is equal to the total number of input samples.

Compared to a normal MDCT providing floating point samples, the described preferred integer transform shows that the noise compared to the normal MDCT is increased only in the spectral range in which there is little signal level, while this noise increase does not become noticeable at significant signal levels. But the integer processing suggests itself for an efficient hardware implementation, because only multiplication steps are used which may readily be decomposed into shift/add steps which may be hardware-implemented in a simple and quick way. Of course, a software implementation is also possible.

The integer transform provides a good spectral representation of the audio signal and yet remains in the area of integers. When it is applied to tonal parts of an audio signal, this results in good energy concentration. With this, an efficient lossless coding scheme may be built up by simply cascading the windowing/transform illustrated in FIG. 3 with an entropy coder. In particular, stacked coding using escape values, as it is employed in MPEG AAC, is advantageous. It is preferred to scale down all values by a certain power of two until they fit in a desired code table, and then additionally code the omitted least significant bits. In comparison with the alternative of the use of larger code tables, the described alternative is more favorable with regard to the storage consumption for storing the code tables. An almost lossless coder could also be obtained by simply omitting certain ones of the least significant bits.

In particular for tonal signals, entropy coding of the integer spectral values allows a high coding gain. For transient parts of the signal, the coding gain is low, namely due to the flat spectrum of transient signals, i.e. due to a small number of spectral values equal to or almost 0. As described in J. Herre, J. D. Johnston: "Enhancing the Performance of Perceptual Audio Coders by Using Temporal Noise Shaping (TNS)" 101$^{st}$ AES Convention, Los Angeles, 1996, preprint 4384, this flatness may be used, however, by using a linear prediction in the frequency domain. An alternative is a prediction with open loop. Another alternative is the predictor with closed loop. The first alternative, i.e. the predictor with open loop, is called TNS. The quantization after the prediction leads to an adaptation of the resulting quantization noise to the temporal structure of the audio signal and thus prevents pre-echoes in psychoacoustic audio coders. For lossless audio coding, the second alternative, i.e. with a predictor with closed loop, is more suitable, since the prediction with closed loop allows accurate reconstruction of the input signal. When this technique is applied to a generated spectrum, a rounding step has to be performed after each step of the prediction filter in order to stay in the area of the integers. By using the inverse filter and the same rounding function, the original spectrum may accurately be reproduced.

In order to make use of the redundancy between two channels for data reduction, center-side coding may be also employed in a lossless manner, if a rounded rotation with an angle of π/4 is used. In comparison to the alternative of calculating the sum and difference of the left and the right channel of a stereo signal, the rounded rotation has the advantage of energy conservation. The use of so-called joint stereo coding techniques may be switched on or off for each band, as it is also performed in the standard MPEG AAC. Further rotation angles may also be considered to be able to reduce redundancy between two channels more flexibly.

Particularly the transform concept illustrated with respect to FIG. 3 provides an integer implementation of the MDCT, i.e. an IntMDCT, which operates losslessly with respect to forward transform and subsequent backward transform. By the rounding steps 20, 24, 28 and the corresponding rounding steps in the integer DCT (block 14 in FIG. 3), there is further always possible an integer processing, i.e. processing with more roughly quantized values than they have been generated, for example, by floating point multiplication with a lifting matrix (blocks 18, 22, 26 of FIG. 3).

The result is that the whole IntMDCT may be performed efficiently with respect to calculating.

The losslessness of this IntMDCT or, generally speaking, the losslessness of all coding algorithms referred to as lossless is related to the fact that the signal, when it is coded to achieve a coded signal and when it is afterwards again decoded to achieve a coded/decoded signal, "looks" exactly like the original signal. In other words, the original signal is identical to the coded/decoded original signal. This is an obvious contrast to a so-called lossy coding, in which, as in the case of audio coders operating on a psychoacoustic basis, data are irretrievably lost by the coding process and particularly by the quantizing process controlled by a psychoacoustic model.

Of course, rounding errors are still introduced. Thus, as shown with respect to FIG. 3 in the blocks 20, 24, 28, rounding steps are performed which, of course, introduce a rounding error which is only "eliminated" in the decoder when the inverse operations are performed. Thus lossless coding/decoding concept differ essentially from lossy coding/decoding concepts in that, in lossless coding/decoding concepts, the rounding error is introduced so that it may be eliminated again, while this is not the case in lossy coding/decoding concepts.

However, if you consider the coded signal, i.e., in the example of transform coders, the spectrum of a block of temporal samples, the rounding in the forward transform and/or generally the quantization of such a signal results in an error being introduced in the signal. Thus, a rounding error is superimposed on the ideal error-free spectrum of the signal, the error being typically, for example in the case of FIG. 3, white noise equally including all frequency components of the considered spectral range. This white noise superimposed on the ideal spectrum thus represents the rounding error which occurs, for example, by the rounding in the blocks 20, 24, 28 during windowing, i.e. the pre-processing of the signal prior to the actual DCT in block 14. It is particularly to be noted that, for a losslessness requirement, the whole rounding error must necessarily be coded, i.e. transmitted to the decoder, because the decoder requires the whole rounding error introduced in the coder to achieve a correct lossless reconstruction.

The rounding error may not be problematic when nothing is "done" with the spectral representation, i.e. when the spectral representation is only stored, transmitted and decoded again by a correctly matching inverse decoder. In that case, the losslessness criterion will always be met, irrespective of how much rounding error has been introduced into the spectrum. If, however, something is done with the spectral representation, i.e. with the ideal spectral representation of an original signal containing a rounding error, for example if scalability layers are generated, etc., all these things work better, the smaller the rounding error.

Thus, there is also a requirement in lossless codings/decodings that, on the one hand, a signal should be losslessly reconstructable by special decoders, that, however, a signal also should have a minimal rounding error in its spectral representation to preserve flexibility in that also non-ideal lossless decoders may be fed with the spectral representation or that scaling layers, etc. may be generated.

As discussed above, the rounding error is expressed as white noise across the entire considered spectrum. On the other hand, particularly in high quality applications, such as they are especially interesting for the lossless case, i.e. in audio applications with very high sampling frequencies, such as 96 kHz, the audio signal only has a reasonably signal content in a certain spectral range, which typically only reaches up to, at the most, 20 kHz. Typically, the range in which most signal energy of the audio signal is concentrated will be the range between 0 and 10 kHz, while the signal energy will considerably decrease in the range above 10 kHz. However, this does not matter to the white noise introduced by rounding. It superimposes itself across the entire considered spectral range of the signal energy. The result is that, in spectral ranges, i.e. typically in the high spectral ranges where there is no or only very little audio signal energy, there will be only the rounding error. At the same time, particularly due to its non-deterministic nature, the rounding error is also difficult to code, i.e. it is only codeable with relatively high bit requirements. The bit requirements do not play the decisive role, particularly in some lossless applications. However, for lossless coding applications to become more and more widespread, it is very important to operate very bit-efficiently also here to combine the advantage of the absent quality reduction inherent in lossless applications also with corresponding bit efficiency, as it is known from lossy coding concepts.

Although a rounding error is thus unproblematic in a lossless context in that it may be eliminated in the decoding, it is still of considerable significance for allowing the lossless decoding and/or reconstruction to be performed in the first place. On the other hand, as already discussed, the rounding error is responsible for the spectral representation becoming defective, i.e. being distorted as compared to an ideal spectral representation of the unrounded signal. For special cases of application, in which the spectral representation, i.e. the coded signal, is actually important, i.e. when, for example, various scaling layers are generated from the coded signal, it is still desirable to obtain a coded representation with a rounding error as small as possible from which, however, no rounding error has been eliminated that is required for a reconstruction.

SUMMARY OF THE INVENTION

It is the object of the present invention to provide an artifact-reduced concept for processing input values.

In accordance with a first aspect, the present invention provides a device for processing at least two input values, having a unit for providing a first non-integer input value and a second non-integer input value, wherein the unit for providing is designed to weight a first original value to obtain the first input value, and to calculate the second input value by a transform from a sequence of original input values to which the original first value belongs, or to generate the first input value from a first original value and a third value by a first and a second lifting step and a subsequent weighting, and to generate the second input value by weighting from an original second input value; and a unit for combining the first input value and the second input value to obtain a non-integer result value and for rounding the result value to obtain a rounded result value.

In accordance with a second aspect, the present invention provides a method for processing at least two input values, having the steps of providing a first non-integer input value and a second non-integer input value, wherein the step of providing includes weighting a first original value to obtain the first input value and calculating the second input value by a transform from a sequence of original input values to which the original first value belongs, or wherein the step of providing includes generating the first input value from a first original value and a third value by a first and a second lifting step and a subsequent weighting and generating the second input value by weighting from an original second input value; and combining the first input value and the second input value to obtain a non-integer result value, and rounding the result value to obtain a rounded result value.

In accordance with a third aspect, the present invention provides a computer program having a program code for performing the above-mentioned method, when the program runs on an computer.

The present invention is based on the finding that a reduction of the rounding error may be achieved by reducing the rounding error, whenever two values would actually have to be rounded and the two rounded values are then combined to a third further value, for example by addition, by first adding the two values in unrounded state, i.e. as floating point representation, and then only adding the added output value to the third value. Compared to the usual procedure, in which each value is processed individually, the inventive concept further results in saving one summation process and one rounding process, so that the inventive concept, in addition to the fact that the rounding error is reduced, also contributes to a more efficient algorithm execution.

In a preferred embodiment of the present invention, the inventive concept is used for reducing the rounding error when two rotations divided into lifting steps "abut" each other, i.e. when there is a situation where first a first value is to be "rotated" together with a third value, and when the result of this first rotation is then again to be rotated with a second value.

A further case of application of the inventive concept for reducing the rounding error exists when a lifting stage of a multi-dimensional lifting concept is preceded by butterflies, such as it occurs when an N-point DCT is split into two DCTs having half the length, i.e. with N/2 points. In this case, there will be a butterfly stage before the actual multi-dimensional lifting and there will be a rotation stage after the multi-dimensional lifting. In particular, the roundings required by the butterfly stage may be combined with the roundings of the first lifting stage of the multi-dimensional lifting concept to reduce the rounding error.

Since the number of rounding stages in the integer MDCT with integer windowing/pre-processing and multi-dimensional lifting processing for the transform is already significantly reduced as compared to prior art without applying the invention, particularly in this situation, the inventive concept contributes to a significant reduction of the remaining, although already small, rounding error. This results in, for example, a spectrum now having only a small deviation with respect to an ideal spectrum, due to the still present, but now much reduced rounding error.

Particularly in the context of lossless coding/decoding, the present invention may be combined with the spectral shaping of the rounding error, wherein the still remaining rounding error is spectrally shaped such that it is "accommodated" in the frequency range of the signal to be coded in which the signal has a high signal energy anyway, and that, as a consequence, the rounding error is not present in ranges in which the signal has no energy anyway. While, in prior art, a rounding error was distributed white across the entire spectrum of the signal in lossless coding and particularly in lossless coding on the basis of integer algorithms, the rounding error is superimposed on the ideal spectrum in the form of pink noise, i.e. such that the noise energy due to the rounding is present where the signal has its highest signal energy anyway, and that thus the noise due to the rounding error has also little or even absent energy where the signal to be coded has no energy itself. Thus the worst case is avoided, in which the rounding error which is a stochastic signal and is thus difficult to code, is the only signal to be coded in a frequency range and thus unnecessarily increases the bit rate.

When considering an audio signal in which the energy is in the low frequency range, the means for rounding is designed to achieve a spectral low pass shaping of the generated rounding error such that, at high frequencies of the coded signal, there is neither signal energy nor noise energy, while the rounding error is mapped into the range where the signal has a lot of energy anyway.

Particularly for lossless coding applications, this is in contrast to prior art where a rounding error is spectrally high-pass filtered to get the rounding error outside of the audible range. This also corresponds to the case where the spectral range in which the rounding error is present is filtered out either electronically or by the ear itself to eliminate the rounding error. For lossless coding/decoding, however, the rounding error is absolutely required in the decoder, because otherwise the algorithm used in the decoder, which is inverse to the lossless coding algorithm, generates distortions.

The concept of the spectral shaping of the rounding error is preferably used in lossless applications with a high sampling rate, because, particularly in the cases where spectra theoretically extend to up to more than 40 kHz (due to oversampling), the same situation is achieved in the high frequency range, in which there is no signal energy anyway, i.e. in which coding may be done very efficiently, as in the case of a non-integer coding, in which the signal energy is also zero in the high frequency range.

As a large number of zeros is coded very efficiently and the rounding error, which is problematic to code, is shifted to the range which is typically coded very finely anyway, the overall data rate of the signal is thus reduced as compared to the case in which the rounding error is distributed as white noise across the entire frequency range. Furthermore, the coding performance—and hence also the decoding performance—is increased, because no computing time has to be spent for the coding and decoding of the high frequency range. The concept thus also has the result that a faster signal processing may be achieved on the part of the coder and/or on the part of the decoder.

In an embodiment, the concept of shaping/reducing the approximation error is applied to invertible integer transforms, particularly the IntMDCT. There are two areas of application, namely, on the one hand, multidimensional lifting, with which the MDCT is considerably simplified with respect to the required rounding steps, and, on the other hand, the rounding operations required in integer windowing, such as they occur in the pre-processing prior to the actual DCT.

An error feedback concept is used for the spectral shaping of the rounding error, in which the rounding error is shifted to the frequency range in which the signal being processed has the highest signal energy. For audio signals, and particularly also for video signals, this will be the low frequency range, so that the error feedback system has a low-pass property. This results in fewer rounding errors in the upper frequency range, in which there are normally fewer signal components. In prior art, the rounding errors prevail in the upper range, which must then be coded and thus increase the number of bits required for coding. Preferably, this rounding error is reduced in the higher frequencies, which directly reduces the number of bits required for coding.

BRIEF DESCRIPTION OF THE DRAWINGS

Preferred embodiments of the present invention are explained in more detail below with respect to the accompanying drawings, in which:

FIG. 6b shows a block circuit diagram of a known decoder for decoding the values generated by FIG. 10a;

FIGS. 10a-10c show block circuit diagrams of a device for converting according to a preferred embodiment of the present invention;

DESCRIPTION OF THE PREFERRED EMBODIMENTS

Figure 1:
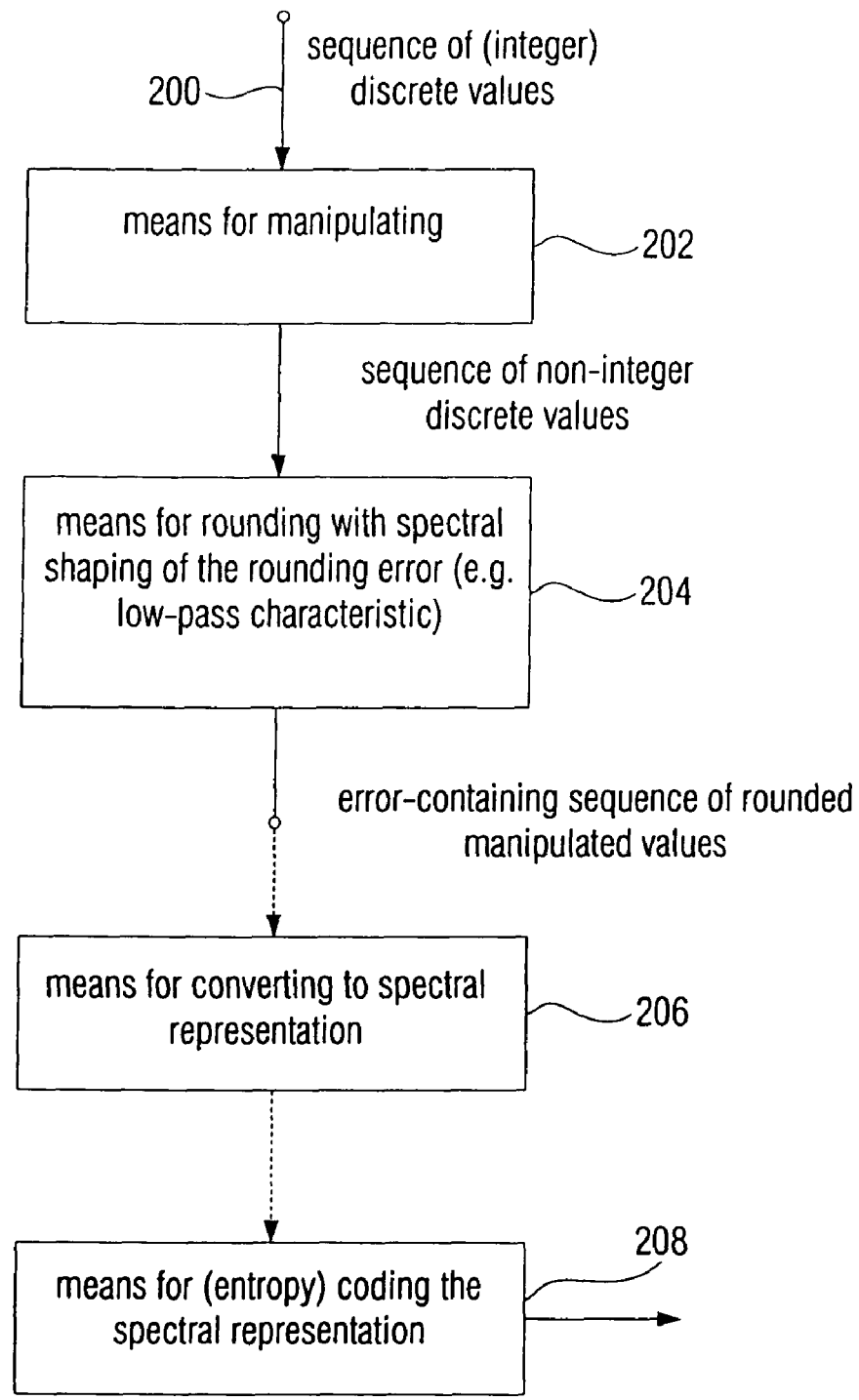
FIG. 1 shows a block circuit diagram of the concept for processing a signal having a sequence of discrete values with spectral shaping of the rounding error.

FIG. 1 shows a device for processing a signal having a sequence of discrete values which is input to means 202 for manipulating via a signal input 200. The signal is typically formed to have a first frequency range in which the signal has a high energy and to have a second frequency range in which the signal has a comparatively low energy. If the first signal is an audio signal, it will have the high energy in the first frequency range, i.e. in the low frequency range, and will have the low energy in the high frequency range. If, however, the signal is a video signal, it will also have the high energy in the low range, and will have the low energy in the high range. In contrast to the audio signal, the frequency range in the video signal is a spatial frequency range, unless successive video frames are considered in which there also exists a temporal frequency, for example related to a selected image area, in successive frames.

The means 202 for manipulating is generally formed to manipulate the sequence of discrete values so that a sequence of manipulated values is obtained in which at least one manipulated value is not integer. This sequence of non-integer discrete values is fed to means 204 for rounding the sequence of manipulated values to obtain a sequence of rounded manipulated values. The means 204 for rounding is formed to effect a spectral shaping of a rounding error generated by the rounding so that, in the first frequency range, i.e. in the frequency range where the original signal has a high energy, a spectrally shaped rounding error also has a high energy, and that, in the second frequency range, i.e. in the frequency range where the original signal has a low energy, the spectrally shaped rounding error also has a low or no energy. Generally, the energy of the spectrally shaped rounding error in the first frequency range is thus higher than the energy of the spectrally shaped rounding error in the second frequency range. However, the spectral shaping preferably does not change anything in the overall energy of the rounding error.

Preferably, the device for generating the error-containing sequence of rounded manipulated values is coupled to means 206 for converting to a spectral representation either directly or via further manipulation or rounding combinations. Thus, the error-containing sequence of rounded manipulated values may be fed directly into the means 206 for converting to a spectral representation to achieve a direct spectrum of the error-containing sequence of rounded manipulated values. However, in an embodiment, the means for manipulating is a lifting step and/or a lifting matrix, and the means for rounding is formed to round the non-integer results of a lifting step. In this case, the means 204 is followed by a further means for manipulating performing the second lifting step, which, in turn, is followed by means for rounding, which, in turn, is followed by a third means for manipulating implementing the third lifting step, wherein then there is another manipulation so that all three lifting steps are accomplished. Thus, an error-containing sequence of rounded manipulated values derived from the original error-containing sequence of rounded manipulated values at the output of means 204 is generated, which is then finally converted to a spectral representation, preferably also by an integer transform, as it is illustrated by block 206. The output signal of the spectral representation at the output of block 206 has now a spectrum which, in contrast to prior art, does no longer have a white distributed rounding error, but a rounding error shaped spectrally, i.e. so that there is also a high rounding error energy where the actual "useful spectrum" has a high signal energy, while even in the best case there is no rounding error energy in the frequency ranges in which there is no signal energy.

This spectrum is then supplied to means 208 for entropy-coding of the spectral representation. The means for entropy-coding can comprise any coding method, such as a Huffman coding, an arithmetic coding, etc. Especially for coding a large number of spectral lines which are zero and border on each other, a run length coding is also suitable which, of course, cannot be applied in prior art, because here an actually deterministic signal must be coded in such frequency ranges which, however, has a white spectrum and thus is especially unfavorable for any kind of coding tools, because the individual spectral values are completely uncorrelated to each other.

Subsequently, a preferred embodiment of the means 204 for rounding with spectral shaping is discussed with respect to FIGS. 2a, 2b, 2c.

Figure 2A:
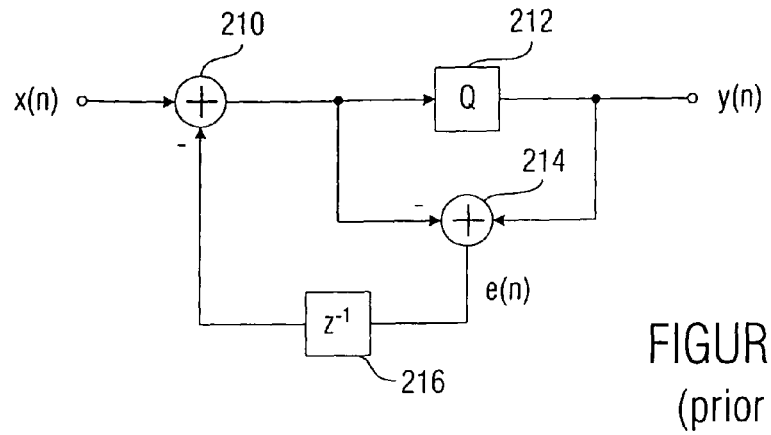
FIG. 2a shows a known concept for high-pass spectral shaping a quantization error.

FIG. 2a shows a known error feedback system for the spectral shaping of a quantization error, as it is described in the specialist book "Digitale Audiosignalverarbeitung", U. Zoelzer, Teubner-Verlag, Stuttgart, 1997. An input value x(i) is supplied to an input summer 210. The output signal of the summer 210 is supplied to a quantizer 212 providing a quantized output value y(i) at an output of the spectral shaping device. At a second summer 214, the difference between the value after the quantizer 212 and the value before the quantizer 212 is determined, i.e. the rounding error e(i). The output signal of the second summer 214 is fed to a delay means 216. The error e(i) delayed by one time unit is then subtracted from the input value by means of the adder 210. This results in a high-pass evaluation of the original error signal e(n).

If $z^{-1}(-2+z^{-1})$ is used instead of the delay means $z^{-1}$ designated 216 in FIG. 2a, the result is a second order high-pass evaluation. In certain embodiments, such spectral shapings of the quantization error are used to "mask out" the quantization error from the perceptible range, i.e. for example from the low-pass range of the signal x(n), so that the quantization error is not perceived.

Figure 2B:
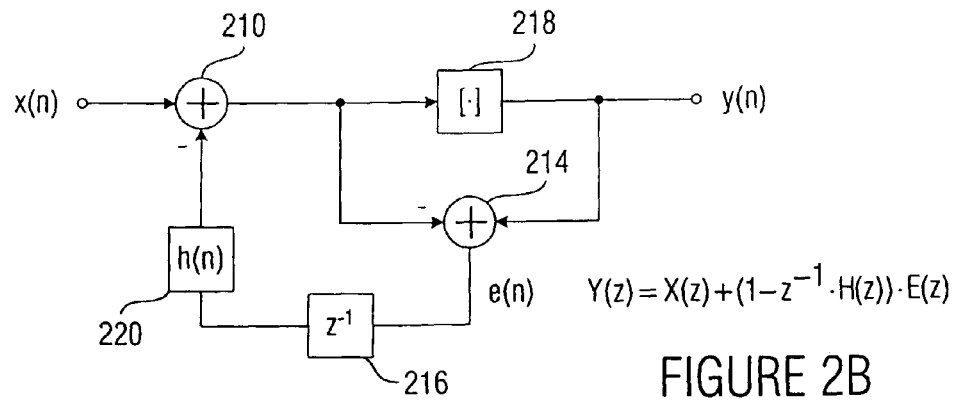
FIG. 2b shows a concept for low-pass shaping the rounding error.

As shown in FIG. 2b, a low-pass evaluation is performed instead to achieve a spectral shaping of the error not outside the range of perception, but exactly into the range of perception. For this, the output signal of the adder 210, as shown in FIG. 2b, is fed to a rounding block 218 implementing some rounding function which may be, for example, rounding up, rounding down, rounding by truncating, rounding up/rounding down to the next integer or to the next but one, next but two . . . integer. In the error feedback path, i.e. between the adder 214 and the adder 210, there is now a further feedback block 220 with an impulse response h(n) and/or a transfer function H(z) in addition to the delay member 216. The z-transform of the output sequence, i.e. Y(z), is related to the input sequence X(z) via the equation illustrated in FIG. 2b.

$$e(n)=x'(n)-y(n)$$

In the above equation, x(n) is the input signal to the adder 210, and y(n) is the output signal from the rounding block 218.

Furthermore, the following equation applies:

$$y(n)=\text{round}(x'(n))$$

In the above equation, "round" represents the rounding function implemented by the block 218. Furthermore, the following equation applies, in which "*" represents the convolution operation:

$$x'(n)=x(n)-h(n)*e(n-1)$$

In the Z-range, there is the following result:

$$Y(z)=X'(z)+E(z)$$

$$X'(z)=X(z)-E(z)z^{-1}H(z)$$

$$Y(z)=X(z)+(1-z^{-1}H(z))E(z)$$

Since E(z) is the rounding error, it is spectrally shaped by the filter $(1-z^{-1}H(z))$. According to the invention, now a low pass-like transfer function is used. The simplest low pass-like transfer function can be obtained when setting, for example, H(z)=−1. In this simple example, the rounding error of the previous rounding operation is thus simply added to the value to be rounded before the next rounding operation is applied. Thus, a simple low-pass filtering of the rounding error, which is very efficient for the present invention and is thus preferred, is achieved.

Figure 2C:
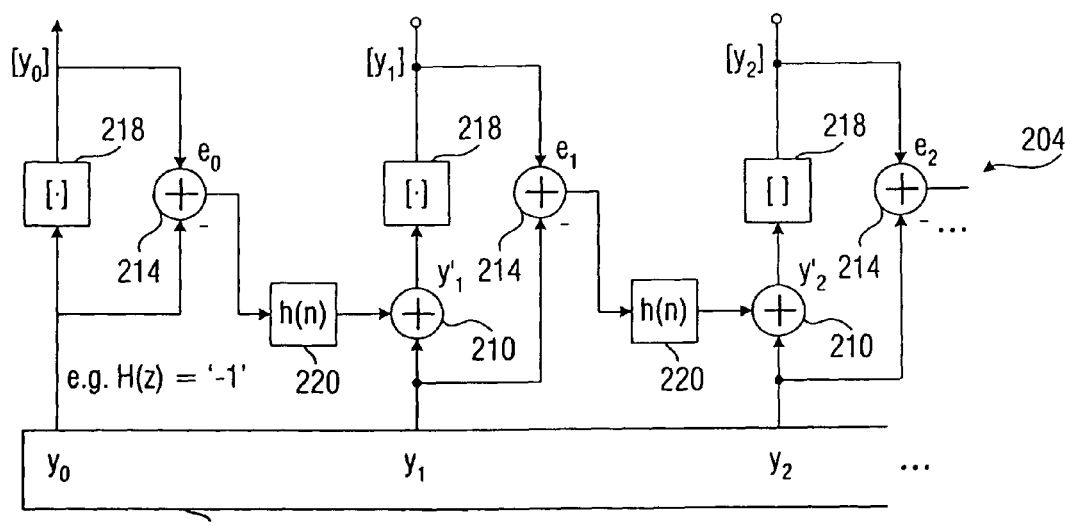
FIG. 2c shows a block circuit diagram according to an embodiment for the spectral shaping/rounding block.

An implementation is illustrated in FIG. 2c. In particular, the means 202 for manipulating an original sequence of integer discrete values is illustrated which provides the sequence of non-integer discrete values $y_0, y_1, y_2, \ldots, y_i$ on the output side. Now, in contrast to prior art, each value is no longer rounded for itself, as illustrated, for example, with respect to blocks 20, 24, 28 in FIG. 3 or with respect to blocks 104, 110, 142 in FIG. 10 or 126, 132, 150 in FIG. 11. Instead, the non-integer discrete values of the sequence $y_0, y_1, y_2, y_3, \ldots$ are filtered depending on each other with low-pass characteristic in the feedback branch by the "network" shown in FIG. 2c, so that the result is the described spectral shaping. Like elements in FIG. 2c and FIG. 2b are illustrated with the same reference numerals.

Furthermore, FIG. 2c shows a parallel implementation, i.e. an implementation in which the values to be rounded are provided in parallel. Of course, this illustration is only schematic. The values $y_0, y_1, y_2, \ldots$ may be provided sequentially to then obtain sequential output values, wherein, in this case, a single implementation of the structure of the elements 210, 214, 216, 218, 220 is sufficient. The repeating structures of the elements 214, 218, 210, 220 are illustrated only for the sake of clarity.

The means 204 for rounding shown in FIG. 2c thus operates to first calculate the rounded value $[y_0]$. Then the rounding error $i_0$ is calculated. Then, the rounding error $i_0$ is weighted (filtered) by block 220 with the transfer function H(z) which is preferably −1, and is fed into the adder 210. This filtered rounding error is added to the next value of the sequence $y_i$, whereupon the result of the adder 210 is rounded in block 218 to obtain the rounded next value $[y_1]$. Subsequently, the rounding error is again determined by the adder 214, i.e. using the rounded value $[y_1]$ and the original value $y_1$, wherein this obtained rounding error $i_1$ is again filtered in block 220 to perform the same procedure for the next value $y_2$ of the sequence.

At this point it is to be noted that the direction is irrelevant. This means that it is also possible to proceed from $y_i$ with larger indices to $y_i$ with smaller indices, i.e. in the opposite direction with respect to that symbolized particularly by the arrows in FIG. 2c extending from block 220 to the adder 210. The order, i.e. whether the procedure proceeds from low to high sequence indices or from high to low sequence indices, is thus not important.

Particularly in the application case of the integer MDCT (IntMDCT), the spectral shaping of the rounding error is preferably used with especial efficiency at places meeting the following conditions:

A rounding error is added at several adjacent values independent of each other.

The adjacent values are (in the broadest sense) time signals which are later converted to a spectral representation by a transform, i.e. which are transferred to the frequency domain.

In the following, there is a more detailed explanation in which parts of the integer MDCT the spectral shaping of the rounding error is preferably used.

Figure 3:
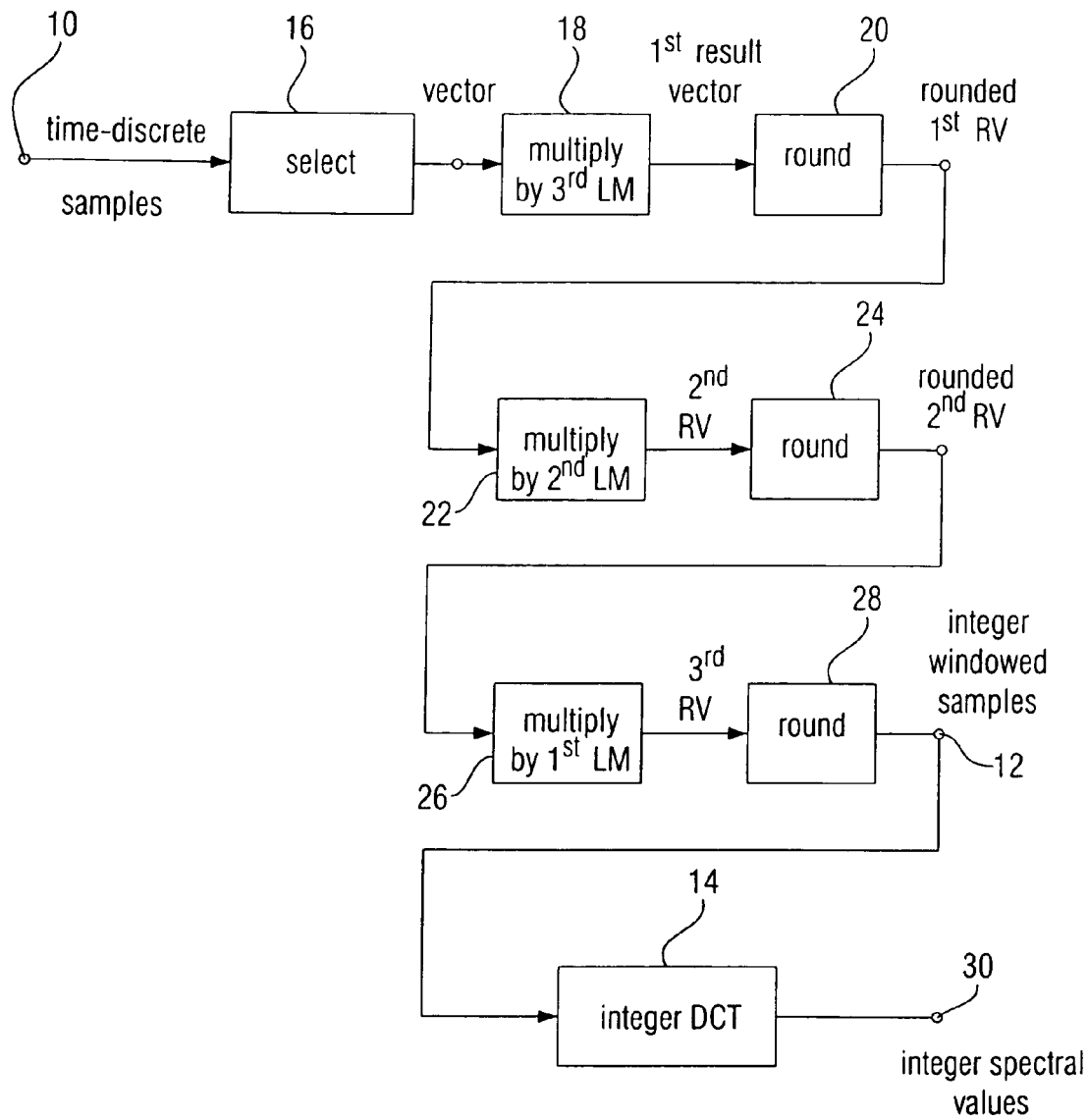
FIG. 3 shows a block circuit diagram of a preferred means for processing time-discrete audio samples to obtain integer values from which integer spectral values may be determined.

The first preferred embodiment consists in the windowing prior to the actual transform, i.e. for the rounding specified in FIG. 3 by the blocks 20, 24, 28. The lifting operation as experienced by each individual original sample $x_1, \ldots, x_N$ and outlined based on FIG. 3 may also be illustrated by the diagram shown in FIG. 7. Here, the applications of the three lifting matrices, i.e. the respective multiplication by a factor for a sample, is illustrated sample-wise, so that the result is the sequence "from top to bottom", "from bottom to top" and "from top to bottom".

Figure 4:
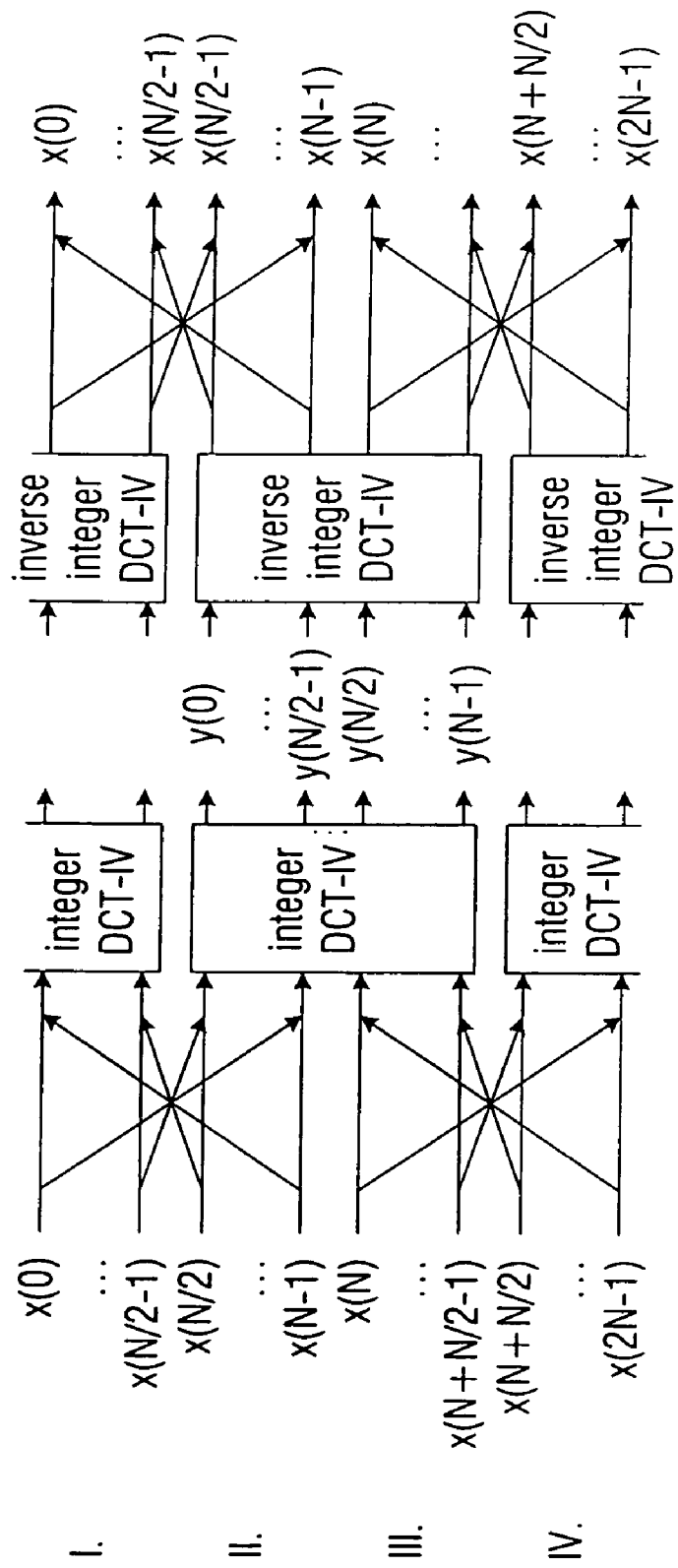
FIG. 4 is a schematic illustration of the decomposition of an MDCT and an inverse MDCT into Givens rotations and two DCT-IV operations.
Figure 5:
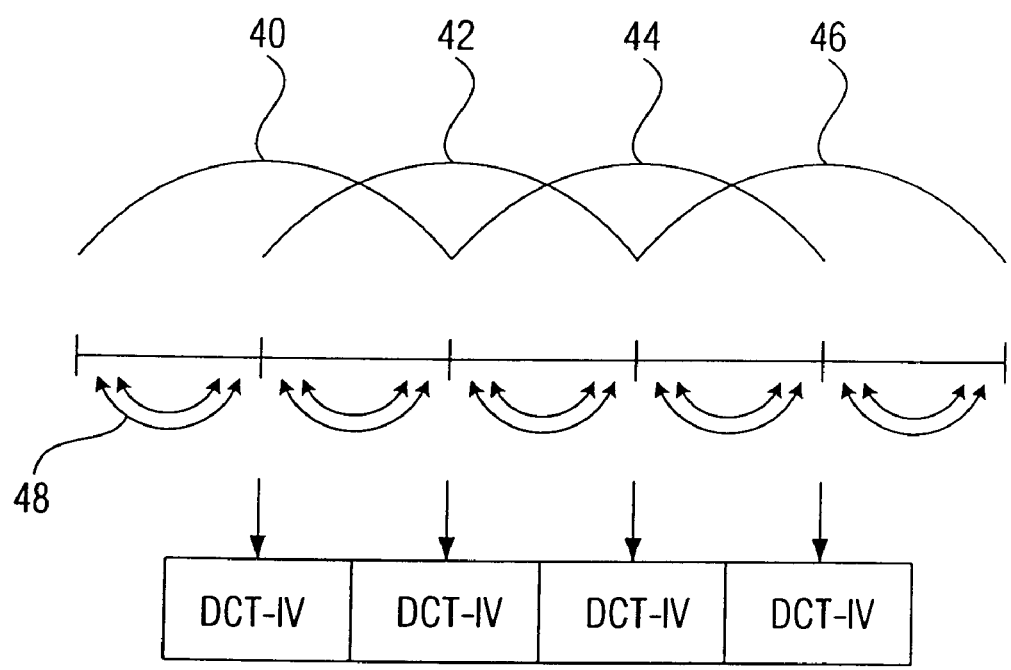
FIG. 5 is an illustration for illustrating the decomposition of the MDCT with 50 percent overlap into rotations and DCT-IV operations.
Figure 6A:
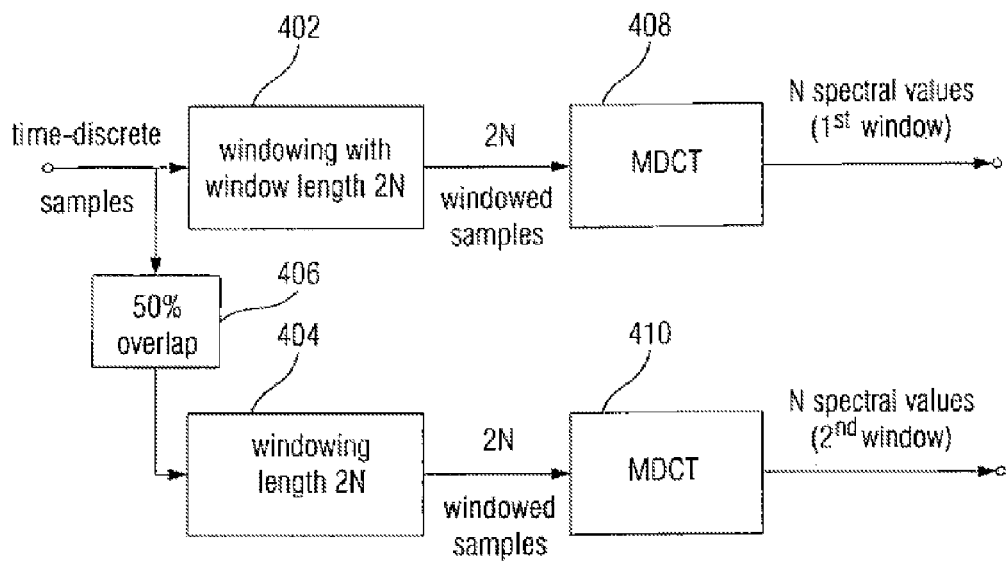
FIG. 6a shows a schematic block circuit diagram of a known coder with MDCT and 50 percent overlap.
Figure 6B:
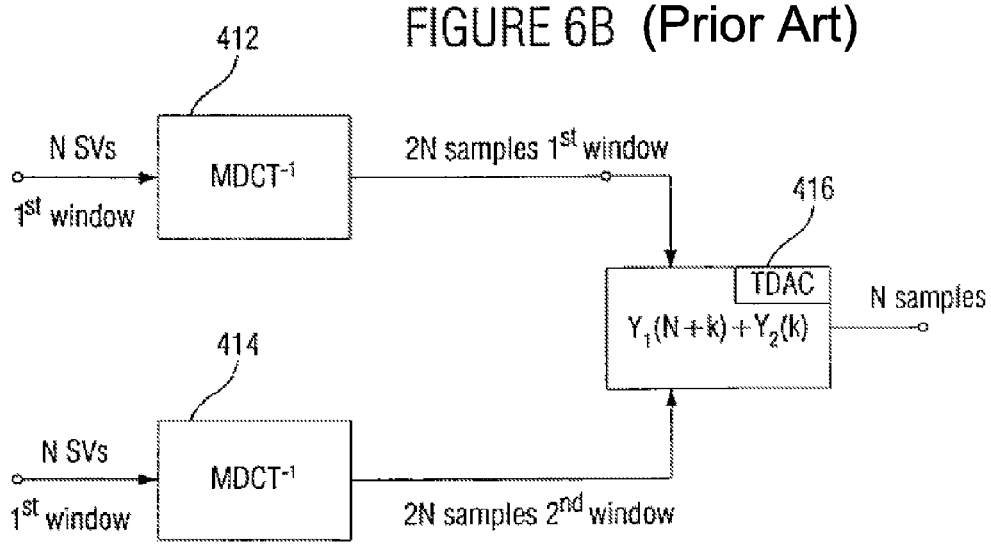
Figure 7:
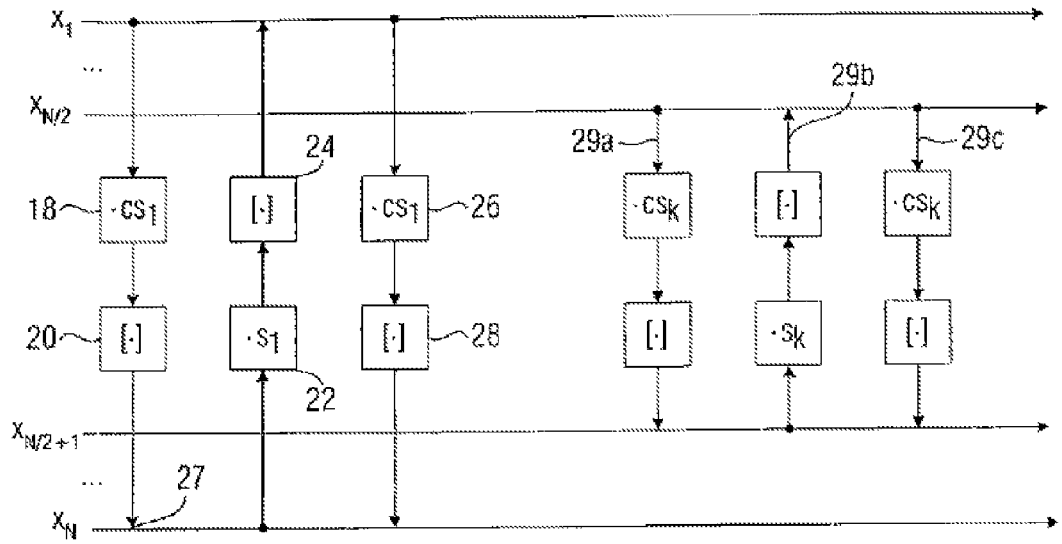
FIG. 7 is an illustration of the lifting in windowing according to FIG. 3.

With respect to the notation in FIG. 7, it is to be noted that, when an arrow meets a horizontal line, an addition is performed there. Such an addition is shown, for example, at 27 in FIG. 7. When FIG. 4 is compared to FIG. 7, the only difference is that x(0) in FIG. 4 corresponds to $x_1$ of FIG. 7. In this respect, $x_N$ in FIG. 7 corresponds to x(N−1) in FIG. 4. However, x(N/2−1) of FIG. 4 corresponds to $x_{N/2}$ of FIG. 7. Furthermore, x(N/2) in FIG. 4 corresponds to $x_{N/2+1}$ of FIG. 7, so that the result are the butterflies shown in FIG. 2 by which always one value from the first quarter of a window is weighted with one value from the second quarter of the window according to the lifting steps, while analogously also a value of the third quarter of the window is processed with a value of the fourth quarter of the window by the "down-up-down system", as illustrated in FIG. 7.

There is a corresponding procedure for the pair of values $x_{N/2}$ and $x_{N/2+1}$. There is again a down-up-down sequence, wherein a down step 29a is followed by an up step 29b, which, in turn, is followed by a down step 29c.

Figure 8:
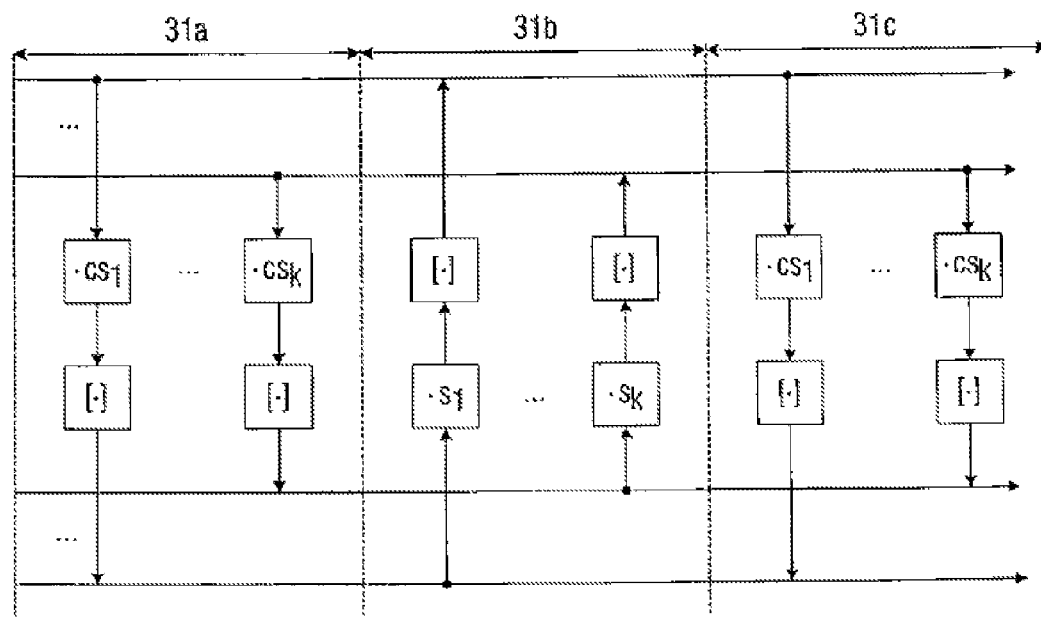
FIG. 8 is a "resorted" illustration of the lifting of FIG. 7 for windowing prior to the actual transform.

FIG. 7 thus shows the integer windowing by lifting. This calculation may also be readily resorted without changing the result, as illustrated in FIG. 8. Thus, of course, all downward steps (all steps 29a) may be performed first. Then all upward steps (29b) may be performed to finally perform all downward steps 29c, so that the result is a downward block 31a, an upward block 31b and again a downward block 31c. It is to be noted that FIG. 8 corresponds to FIG. 7, but in another illustration which is more suitable for understanding the present invention.

Figure 9:
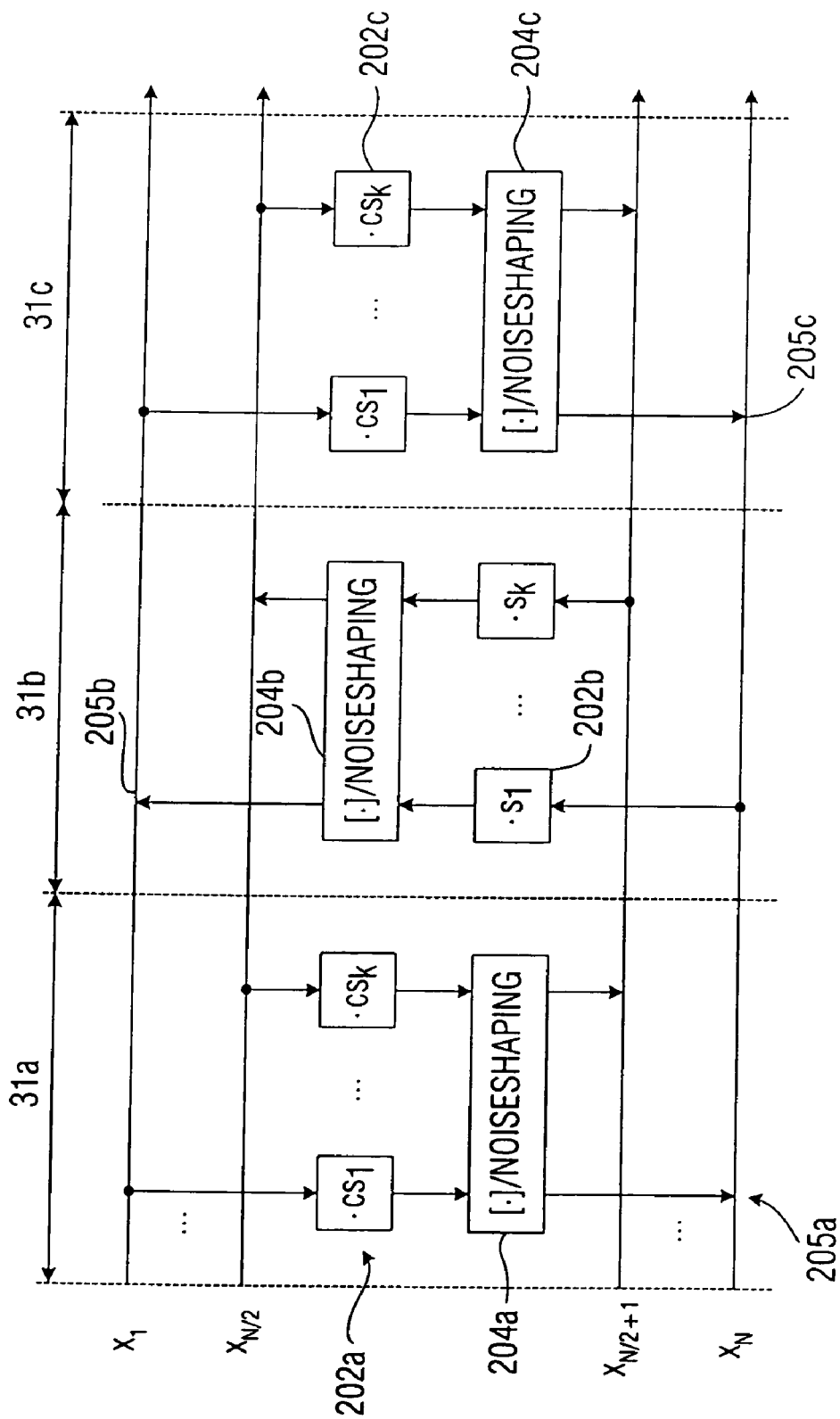
FIG. 9 shows an application of the spectral shaping for windowing according to FIGS. 3, 7 and 8.

FIG. 9 now shows the concept in which the rounding is performed with spectral shaping. The lifting calculation concept shown in FIG. 9 corresponds to FIG. 1 in that the input values $x_1$, $x_{N/2}$ represent the original sequence of integer discrete values at the input 200. The evaluation blocks $cs_1$, $cs_2, \ldots, cs_k$ in the down block 31a together form the means 202 for manipulating. The block designated [.]/NoiseShaping represents the means 204 for rounding of FIG. 1. The error-containing sequence of rounded manipulated values now results at the output of this block 204.

In the embodiment shown in FIG. 9, the sequence of error-containing rounded manipulated values is added to a further sequence $x_{N/2+1}$ to $x_N$ to obtain a new sequence of integer discrete values, which, in turn, is manipulated (by the blocks $s_1$, $s_k$ in the up block 31b) to then again achieve a rounding in the up block 31b by the element 204b. Then there is again provided a value-wise adder 205b, as in the down block 31a, i.e. as in the case of the adder 205a, to obtain the new sequence which, in turn, is fed to a manipulator 202c, wherein the output signal of the manipulator 202c is non-integer and is rounded in a further rounder 204c to be added, in turn, by a further adder 205c, i.e. to the sequence fed to the manipulator 202b.

In the embodiment shown in FIG. 9, the result on the output side is a block of windowed samples which, according to the systematic scheme as illustrated with respect to FIG. 4, are fed to correspondingly shifted DCT-IV blocks. These shifted DCT blocks provide a transform to convert an error-containing sequence of rounded manipulated values to a spectral representation. The DCT-IV blocks in FIG. 4 thus represent an implementation of the means 206 of FIG. 1. Analogously, the blocks for performing the inverse integer DCT-IV represent analogous means for converting to a temporal representation.

Subsequently, the application of the multidimensional lifting is discussed with respect to the FIGS. 10 to 15 to present an integer implementation of the means for converting to the spectral representation 206 of FIG. 10a and/or an analogous integer implementation of the inverse conversion (for a decoder). The concept of the multidimensional lifting is presented in the German patent application having the official reference number 10331803.8.

Figure 10A:
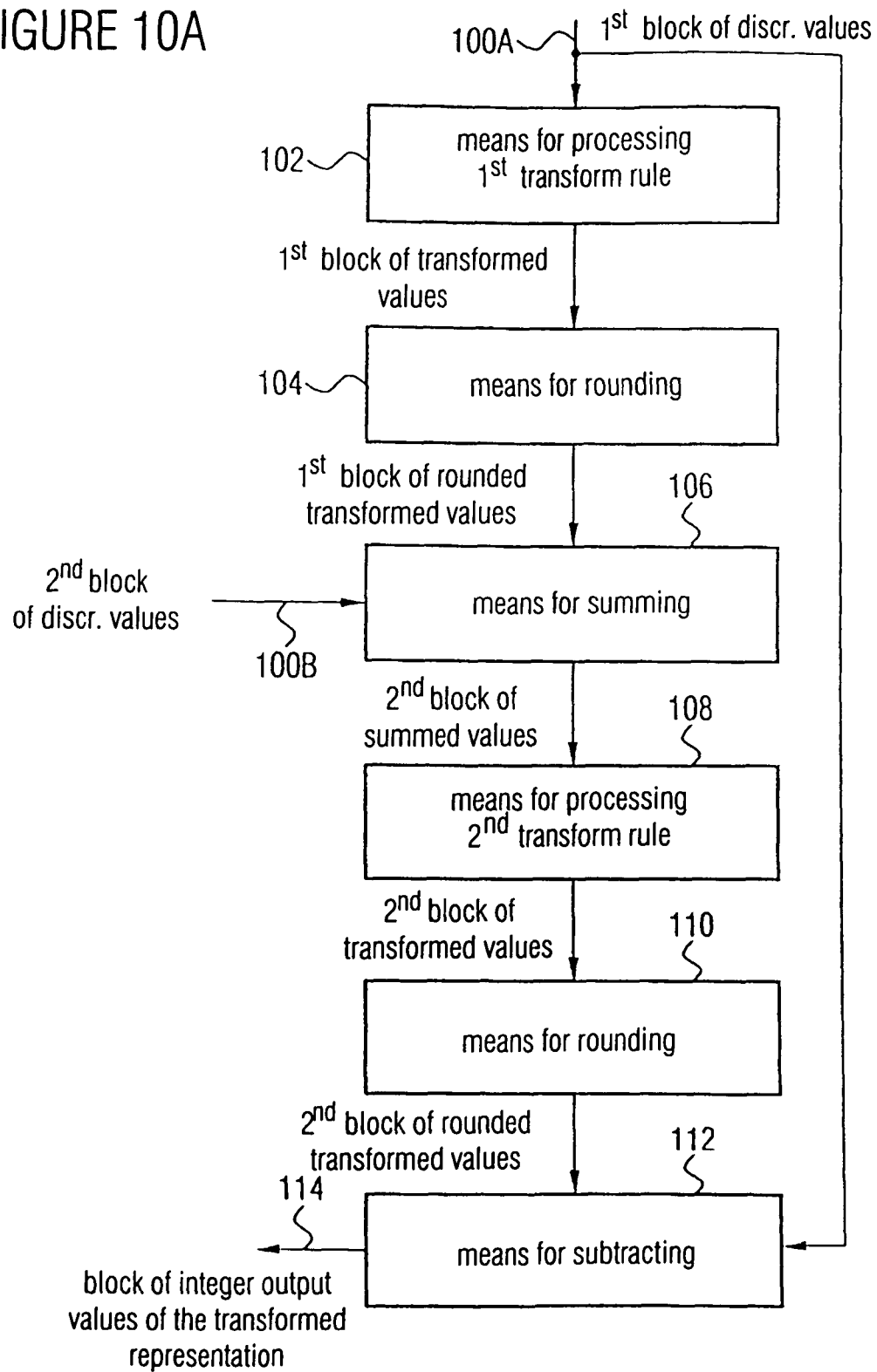

FIG. 10a shows a device for converting discrete values to a transformed representation with integer values. The discrete values are fed to the device via a first input 100a and via a second input 100b. A first block of discrete values is supplied via the input 100a, while a second block of discrete values is supplied via the input 100b. The discrete values represent audio data or image data and/or video data. As discussed below, the first block of discrete values and the second block of discrete values may actually include two temporally successive blocks of audio samples. The first and the second block of discrete values may also include two images represented by discrete values and/or residual values after a prediction or difference values in a difference coding, etc. Alternatively, however, the two blocks of discrete values may have been subjected to pre-processing, such as in the integer implementation of the MDCT, where the first block and the second block of discrete values have been generated by Givens rotations from actually windowed samples. The first and the second block of discrete values may thus be derived from original audio data or image data by some processing, such as rotations, permutations, plus/minus butterflies, scalings, etc. Still, the first and the second block of discrete values obtain audio information and/or image information, although they are not directly audio sampled or discretized image values.

The first block of discrete values is fed to means 102 for processing the first block of discrete values using a first transform rule via the input 100a to obtain a first block of transformed values at an output of the means 102, as shown in FIG. 10a. This first block of transformed values will typically not be integer, but will include floating point values, as they are typically obtained by some transform rule, such as a Fourier transform, a Laplace transform, an FFT, a DCT, a DST, an MDCT, an MDST or some other transform, such as a wavelet transform with any basis functions. The first block of transformed values is fed to means 104 for rounding the first block of transformed values to obtain a first block of rounded transformed values on the output side. The means 104 for rounding is formed to perform some rounding function, such as rounding by truncating or rounding up and/or rounding down to be performed depending on the floating point value, etc.

The rounding rule implemented by the means 104 is thus responsible for the first block of rounded transformed values again comprising only integer values whose accuracy is determined by the rounding rule used by the means 104. The first block of rounded transformed values, just as the second block of discrete values applied to the second input 100b, is supplied to means 106 for summing to obtain a second block of summed values. When the audio signal example is considered, it is apparent that spectral values from the first block of rounded transformed values are added to time values from the second block of discrete values by the means 106. If the discrete values of the second block are, for example, voltage values, it is recommended that the first block of rounded transformed values also exists as voltage amplitudes, i.e. as values with the unit V. In this case, no unit problems are to be expected in the summation. However, it is apparent for those skilled in the art that any unit normalizations may be performed with the first block of rounded transformed values and/or with the second block of discrete values, in that both the first block of rounded transformed values and the second block of discrete values are, for example, unitless.

The second block of summed values is supplied to means 108 for processing the second block of summed values using a second transform rule to obtain a second block of transformed values. If the transform rule used in the means 102 is, for example, a time-frequency transform rule, then the second transform rule used in block 108 is, for example, a frequency-time transform rule. However, these relations may also be reversed, so that the first and the second block of discrete values are, for example, spectral values, so that time values are obtained by the means 102 for processing under the transform rule, while spectral values are again obtained by the means for processing by means of the inverse transform rule, i.e. the means 108. The first and the second transform rule may thus be a forward or a backward transform rule, wherein then the inverse transform rule is the backward transform rule or the forward transform rule, respectively.

The second block of transformed values is fed to means 110 for rounding, as shown in FIG. 10a, to obtain a second block of rounded transformed values which is finally fed to means 112 for subtracting to subtract the second block of rounded transformed values from the first block of discrete values supplied via the first input 108a to obtain a block of integer output values of the transformed representation which may be output at an output 114. By processing the block of integer output values of the transformed representation using any third transform rule which has also been used in the means 102 or which differs from the same and by subsequent rounding of the block of transformed output values to obtain a block of rounded transformed output values, and by subsequent summing of the block of rounded transformed output values and the second block of summed values, a further block of integer output values of the transformed representation may be obtained providing a complete transformed representation of the first and the second block of discrete values with the block of integer output values applied to the output 114.

However, even without the last three steps of processing, rounding and summing, in which the block of integer output values of the transformed representation at the output 114 is used, part of the whole transformed representation may already be obtained, i.e. for example the first half which, when subjected to the inverse processing, allows a back calculation of the first and the second block of discrete values.

It is to be noted at this point that, depending on the transform rule, the first, the second and the third transform rule, if any, may be identical. This is the case, for example, with the DCT-IV. If an FFT was used as the first transform rule, the IFFT, which is not identical to the FFT, could be used as the second (inverse) transform rule.

For calculating reasons it is preferred to provide the transform rule in the form of a matrix, which, if the number of discrete values of the first block is equal to the number of discrete values of the second block, is a quadratic N×N matrix, if the number of discrete values of the first block and the number of discrete values of the second block, respectively, is N.

In one embodiment, the means 104 and 110 for rounding are formed to round according to a rounding function providing rounded results whose accuracy is less than a machine accuracy inherent to a computer performing the functionalities shown in FIG. 10a. With respect to the rounding function, it is to be noted that it maps a non-integer number to the next larger or smaller integer only in one preferred embodiment. The rounding function may also map onto other integers, e.g. the number 17.7 to the number 10 or to the number 20, as long as the rounding function effects a reduction of the accuracy of the number to be rounded. In the above example, the unrounded number is a number with one digit behind the comma, while the rounded number is a number which does no longer have a digit behind the comma.

Although, in FIG. 10a, the means 102 for processing using the first transform rule and the means 108 for processing using the second transform rule are shown as separate means, it is to be noted that, in a concrete implementation, there may exist only one transform function unit which, controlled by a special flow controller, first transforms the first block of discrete values and then inversely transforms the second block of summed values at the corresponding time of the algorithm. In this case, the first and the second transform rules would be identical. The same applies to the two means 104, 110 for rounding. They also do not have to be provided as separate means, but may be implemented by one rounding function unit which, again controlled by the flow controller, first rounds the first block of transformed values and then rounds the second block of transformed values, depending on the requirement of the algorithm.

In one embodiment, the first block of discrete values and the second block of discrete values are the integer windowed samples, as they are obtained at the output of block 28 in FIG. 3. The integer DCT in block 14 of FIG. 3 is then implemented by the integer algorithm shown in FIG. 1 such that the transformed representation in the example of the audio signal to which FIG. 3 relates represents the integer spectral values at the output 30 of the device shown in FIG. 3.

Subsequently, means for inversely converting corresponding to FIG. 10a is illustrated with respect to FIG. 10b, in which, besides the block of integer output values at the output of block 112 of FIG. 10a, there is also used the second block of summed values at the output of the means 106 of FIG. 10a. With respect to FIG. 11, which will be explained in more detail below, this corresponds to the case that there are only the blocks 150 and 130, but not the transform block 124.

FIG. 10b, shows a device for inversely converting a block of integer output values of the transformed representation, as obtained at the output 114 of FIG. 10a, and the second block of summed values. The second block of summed values is fed to an input 120 of the device for inversely converting shown in FIG. 10b. The block of output values of the transformed representation is fed to a further input 122 of the device for inversely converting.

The second block of summed values is fed to means 130 for processing this block using the second transform rule, if the transform rule used last in coding was the second transform rule. The means 130 provides a first block of transformed values on the output side, which is supplied to means 132 for rounding, which, in turn, generates a first block of rounded transformed values on the output side. The first block of rounded transformed values is then subtracted from the block of output values of the transformed representation by means of means 134 to obtain the first block of discrete values at a first output 149 of the device of FIG. 10b.

This first block of discrete values is supplied to means 150 for processing this block using the first transform rule to obtain a second block of transformed values at the output of the means 150. This second block of transformed subtracted values is, in turn, rounded in the means 152 to obtain a second block of rounded transformed values. This second block of rounded transformed values is subtracted from the second block of summed values provided on the input side, which was input via the input 120, to obtain a second block of discrete values at an output 136 on the output side.

With respect to the relation of the first, the second and the third transform rule and with respect to the special implementation of the individual function blocks in FIG. 10b, by common function units and a corresponding flow controller/latching, see the discussion given with respect to FIG. 10a.

Subsequently, a preferred embodiment of the device for converting to a transformed representation generally illustrated in FIG. 10a is described with respect to FIG. 10c. The embodiment in FIG. 10a includes a further transform/rounding as compared to FIG. 10a to generate the further block of integer output values from the second block of summed values.

The first input 100a includes N input lines $x_0, \ldots, x_{N-1}$ for inputting N values of the first block of discrete values. The second input 100b also includes N lines for inputting the N values $x_N, \ldots, x_{2N-1}$ of the second block of discrete values. The means 102 of FIG. 10a is drawn as DCT-IV transformer in FIG. 10c. The DCT transformer 102 is formed to generate N output values from N input values, each of which is then rounded by the rounding rule designated "[.]", as shown by means 104 in FIG. 10c. The means 106 for summing is illustrated such that there is a value-wise summation. This means that the output value of the means 102 with the index 0 is summed with the first value of the second block of discrete values having the index N. Generally, the value of the first block of rounded transformed values at the output of the rounding means 104 with an ordinal number i is thus individually summed with the discrete value of the second block of output values with an ordinal number N+i, wherein i is a running index extending from 0 to N−1.

The means 108 for processing using the second transform rule is also drawn as DCT-IV transformer. In the preferred embodiment shown in FIG. 10c, the means 112 for subtracting is also formed to perform a value-wise subtraction, i.e. such that the output values of the rounder 110, i.e. the values of the second block of rounded transformed values, are individually subtracted from the first block of discrete values. In the embodiment shown in FIG. 10c, it is preferred to perform a corresponding subtraction such that a value of the second block with an ordinal number of N+i is subtracted from a value of the first block with the ordinal number i, wherein i again runs from 0 to N−1. Alternatively, however, there may also be performed other summations/subtractions, such that, for example, a value of a block with the ordinal number of N−1 is subtracted from the value of the other block with the ordinal number N, as long as this is correspondingly taken into account in the inverse conversion.

The means 112 for subtracting already provides a block of integer output values of the transformed representation on the output side, i.e. the integer output values $y_0$ to $y_{N-1}$ of the transformed representation. In order to obtain also the remaining integer output values of the transformed representation, i.e. the further block $y_N$ to $y_{2N-1}$, if this is optionally desired, the block of integer output values of the transformed representation applied to the output 114 is subjected to a transform using the third transform rule by the forward transformer 140, wherein the output values of the same are again rounded, as illustrated by rounding means 142, to now perform an addition of these values with the second block of summed values at the output of the summer 106, as illustrated by the reference numeral 144 in FIG. 10c. The output values of the summer 144 then represent a further block 146 of integer output values of the transformed representation which are designated $y_N$ to $y_{2N-1}$.

Subsequently, a device for inversely converting the transformed representation according to an embodiment is discussed with respect to FIG. 11. It is to be noted that the operations performed by the device illustrated in FIG. 10c are losslessly reversed by the device illustrated in FIG. 11. FIG. 11 corresponds to FIG. 10b, with the exception of the additional transform/rounding stage to generate the second block of summed values, which is fed to the input 120 in the embodiment shown in FIG. 10b, from the further block of transformed output values. It is to be noted that the function of adding is reversed by the function of subtracting, respectively. It is further to be noted that an adder/subtracter pair (144 of FIG. 10c and 128 in FIG. 11) may also be provided with input quantities inverted with respect to the sign, so that, if a group of input quantities is provided with a negative sign as compared to the shown case, the adder 144 then actually performs a subtraction operation, as long as this is taken into account in the counterpart (128 in FIG. 11), which would then actually perform an addition operation.

Figure 10C:
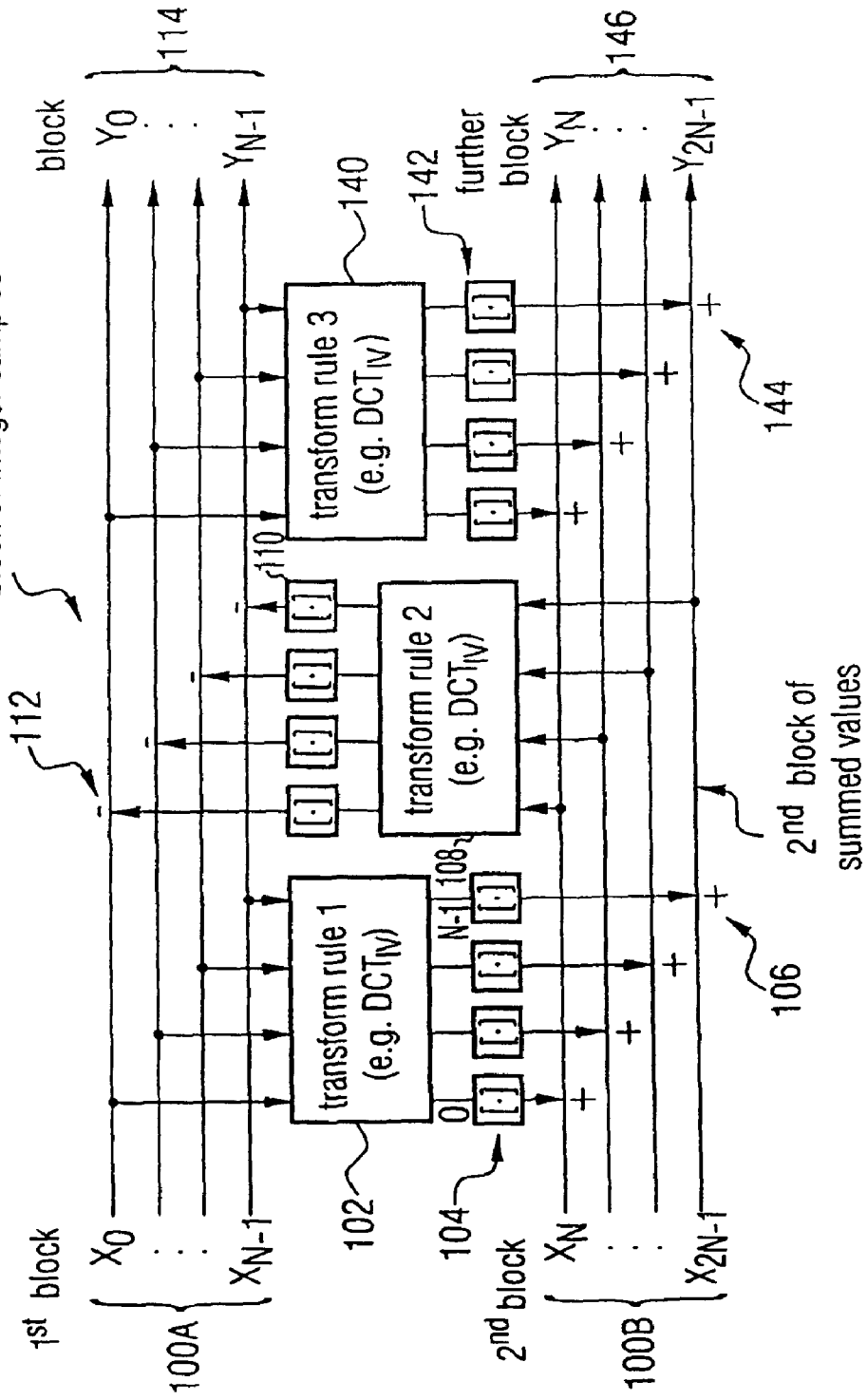
Figure 11:
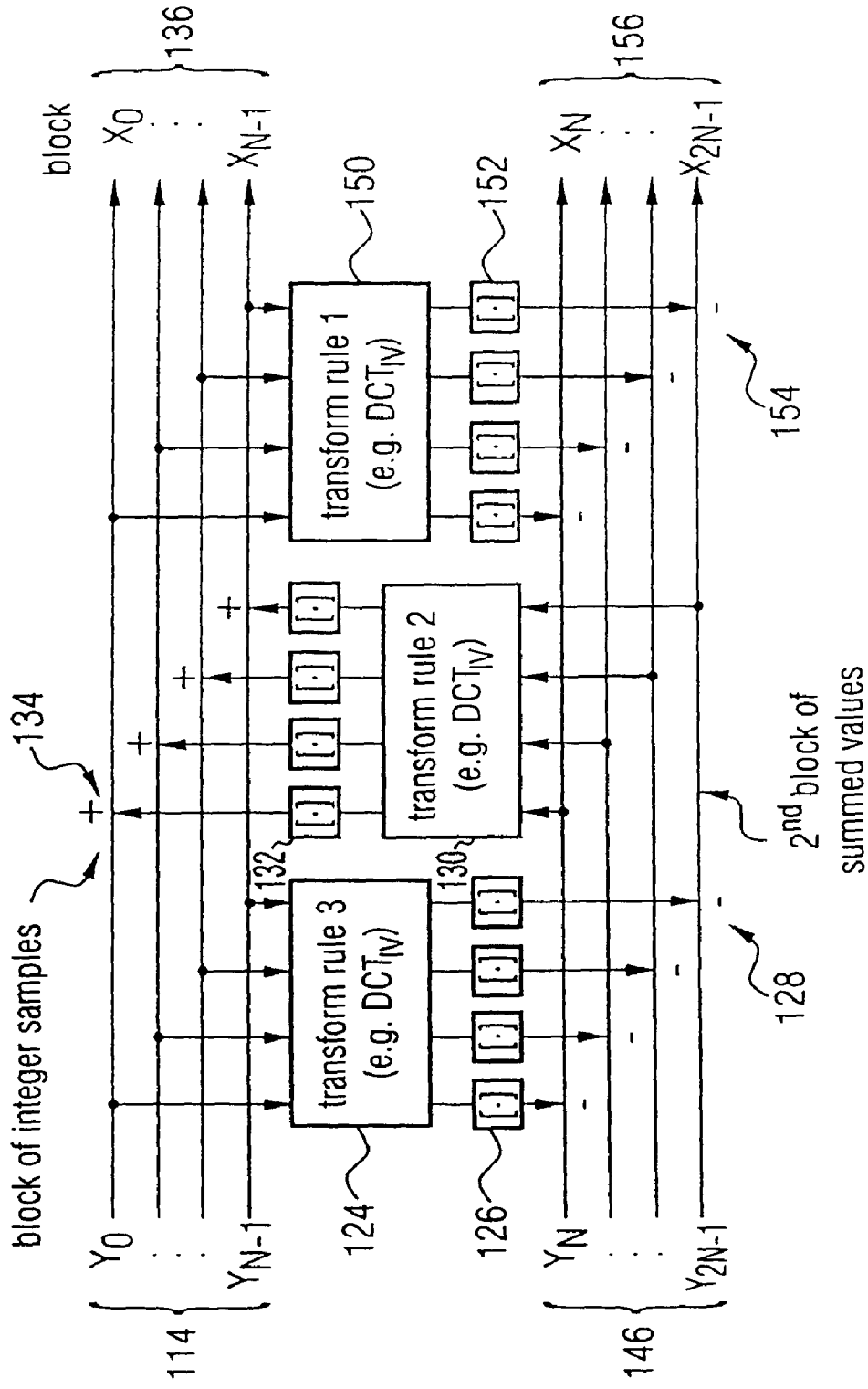
FIG. 11 shows a device for inverse converting according to a preferred embodiment of the present invention.

The subtracter 128 shown in FIG. 11, the adder 134 and the further subtracter 154 are again formed to perform an individual value-wise addition/subtraction, wherein again the same ordinal number processing is used as described with respect to FIG. 10c. If another ordinal number use than shown was employed in FIG. 10c, this would be taken into account correspondingly in FIG. 11.

At the output of the subtracter 134, there is already the first block of discrete values 136 designated $x_0$ to $x_{N-1}$. In order to also obtain the rest of the back-transformed representation, the first block of discrete values is supplied to the transformer 150 operating with the first transform rule, whose values on the output side are rounded by the rounder 152 and are subtracted from the second block of subtracted values at the output of the subtracter 128 to finally also obtain the second block of discrete values 156 designated $x_N, \ldots, x_{2N-1}$.

Subsequently, the mathematical background for the devices, as they were described with respect to the FIGS. 10a, 10b, 10c and 11, is discussed with respect to the FIGS. 12 to 15. By the illustrated device for converting and/or for inversely converting, integer transform methods for a lossless audio coding are provided in which the approximation error is reduced. In addition, the calculation effort is also taken into account in that the basis is no longer the known approach of applying the lifting scheme to each Givens rotation, wherein there always occur trivial sum-difference butterflies here. They considerably increase the computing effort as compared to the original non-integer version of the transform to be copied.

Normally, the lifting scheme is used to obtain an invertible integer approximation of a Givens rotation.

$$\begin{pmatrix} \cos\alpha & -\sin\alpha \\ \sin\alpha & \cos\alpha \end{pmatrix} \cong \begin{pmatrix} 1 & \frac{\cos\alpha - 1}{\sin\alpha} \\ 0 & 1 \end{pmatrix} \begin{pmatrix} 1 & 0 \\ \sin\alpha & 1 \end{pmatrix} \begin{pmatrix} 1 & \frac{\cos\alpha - 1}{\sin\alpha} \\ 0 & 1 \end{pmatrix}$$

This integer approximation is achieved by using a rounding function after each addition, i.e. after each lifting step.

The lifting scheme may also be used for an invertible integer approximation of certain scaling operations. In the specialist publication R. Geiger and G. Schuller, "Integer low delay and MDCT filter banks" Proc. of the Asilomar Conf. on Signals, Systems and Computers, 2002, the following lifting decomposition of a 2×2 scaling matrix with a determinant equal to 1 is discussed and described:

$$\begin{pmatrix} d & 0 \\ 0 & d^{-1} \end{pmatrix} = \begin{pmatrix} -1 & 0 \\ d^{-1} & 1 \end{pmatrix} \begin{pmatrix} 1 & -d \\ 0 & 1 \end{pmatrix} \begin{pmatrix} 0 & 1 \\ 1 & d^{-1} \end{pmatrix}$$

This lifting decomposition, which is one-dimensional, i.e. which only relates to a 2×2 scaling matrix, is extended to the multidimensional case. Specifically, all values from the above equation are substituted by n×n matrices, wherein n, i.e. the number of discrete values of a block, is larger than or equal to 2. Thus the result is that, for any n×n matrix T, which should preferably be invertible, the following decomposition into 2n×2n block matrices is possible, wherein $E_n$ describes the n×n unit matrix:

$$\begin{pmatrix} T & 0 \\ 0 & T^{-1} \end{pmatrix} = \begin{pmatrix} -E_n & 0 \\ T^{-1} & E_n \end{pmatrix} \begin{pmatrix} E_n & -T \\ 0 & E_n \end{pmatrix} \begin{pmatrix} 0 & E_n \\ E_n & T^{-1} \end{pmatrix}$$

In addition to simple operations, such as permutations or multiplications by −1, all three blocks of this decomposition have the following general structure:

$$\begin{pmatrix} E_n & 0 \\ A & E_n \end{pmatrix}$$

For this 2n×2n block matrix, a generalized lifting scheme may be used which is subsequently also referred to as multidimensional lifting.

For a vector of the values $x=(x_0, \ldots, x_{2n-1})$, the application of this block matrix provides the following equation:

$$\begin{pmatrix} E_n & 0 \\ A & E_n \end{pmatrix}(x_0, \ldots, x_{2n-1})' =$$

$$((x_0, \ldots, x_{n-1}), (x_n, \ldots, x_{2n-1}) + A \cdot (x_0, \ldots, x_{n-1})')$$

It is to be noted that, on the right-hand side of the above equation, there is a vector whose dimension, i.e. whose number of lines, equals 2n. The first n components, i.e. the components from 0 to n−1, correspond to $x_0$ to $x_{n-1}$. The second n components, i.e. the second half of the vector resulting on the right-hand side of the above equation, are equal to a sum of the second block of discrete values, i.e. $x_n, \ldots, x_{2n-1}$, but now summed with the multiplication of the matrix A corresponding to the transform matrix of FIGS. 10a, 10b, 10c and 11, and the first block of discrete values $x_0, \ldots, x_{n-1}$. The transform matrix represents the first, the second and the third transform rule, respectively.

Similarly to the common lifting scheme with 2×2 matrices of the form $$\begin{pmatrix} 1 & a \\ 0 & 1 \end{pmatrix}$$

these 2n×2n matrices may be used for invertible integer approximations of the transform T in the following way. For integer input values $(x_0, \ldots, x_{2n-1})$, the floating point output values $(y_0, \ldots, y_{n-1})=A\cdot(x_0, \ldots, x_{n-1})$ are rounded, namely to integer values, before they are added to the integer values $(x_n, \ldots, x_{2n-1})$. The inverse of the block matrix results as follows:

$$\begin{pmatrix} E_n & 0 \\ A & E_n \end{pmatrix}^{-1} = \begin{pmatrix} E_n & 0 \\ -A & E_n \end{pmatrix}$$

Figure 13:
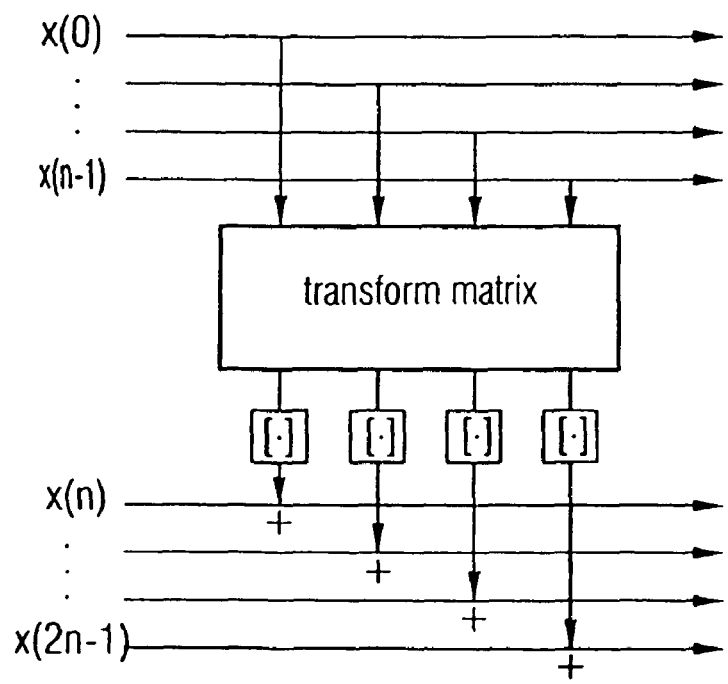
FIG. 13 is a detailed illustration of a multidimensional lifting step with a forward transform matrix.
Figure 14:
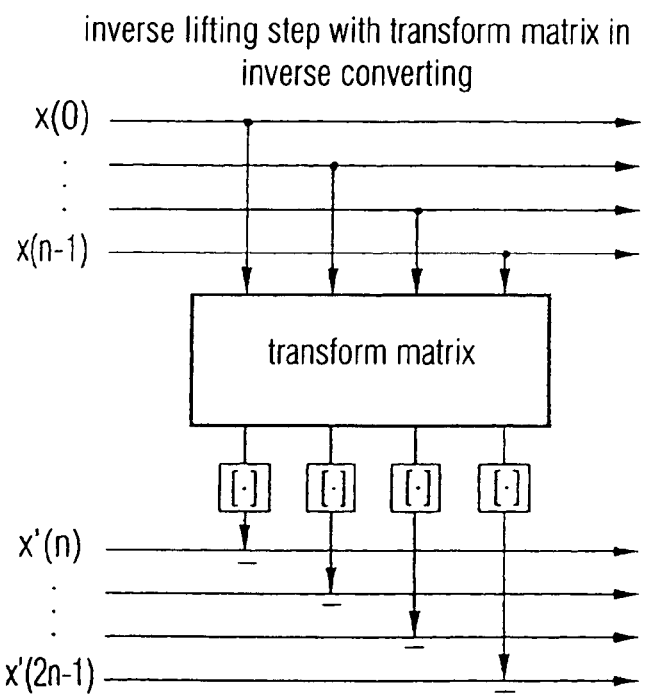
FIG. 14 is an illustration of multidimensional inverse lifting step with a backward transform matrix.

Thus, this process may be inverted without error by simply using the same matrix A and the same rounding function, and by now subtracting the resulting values instead of the adding in the forward processing. The forward processing is illustrated in FIG. 13, while the backward processing is illustrated in FIG. 14. It is to be noted that the transform matrix in FIG. 13 is identical to the transform matrix in FIG. 14, which is preferred for simplicity of the implementation.

Since the values $(x_0, \ldots, x_{n-1})$ are not modified in the forward step shown in FIG. 13, they are still present for the inverse step, i.e. for the backward step in FIG. 14. It is to be noted that there are no specific restrictions for the matrix A. Therefore, it does not necessarily have to be invertible.

In order to obtain an invertible integer approximation of the known MDCT, the MDCT is decomposed into Givens rotations in a first stage, wherein this stage is the windowing stage, and in a subsequent DCT-IV stage. This decomposition is discussed in FIG. 3, which will be explained in the following, and described in detail in DE 10129240 A1.

In contrast to prior art, in which the DCT-IV is decomposed into several stages of Givens rotations, the transform itself is left unchanged and subsequently rounded.

It is known that thus the integer approximation of the DCT-IV is performed by several stages of lifting-based Givens rotations. The number of Givens rotations is determined by the underlying fast algorithm used. Thus, the number of Givens rotations is given by O (N log N) for a transform of the length N. The windowing stage of each MDCT decomposition only consists of N/2 Givens rotations or of 3N/2 rounding steps. Thus, particularly for transform lengths which are high, such as they are used in audio coding applications (for example 1,024), the integer approximation of the DCT-IV provides the main contribution to the approximation error.

The approach uses the described multidimensional lifting scheme. Thus, the number of rounding steps in the $DCT_{IV}$ is reduced to 3N/2, i.e. rendered equal to the number of rounding steps in the windowing stage, i.e. in comparison to about $2N \log_2 N$ rounding steps in the conventional lifting-based approach.

Figure 12:
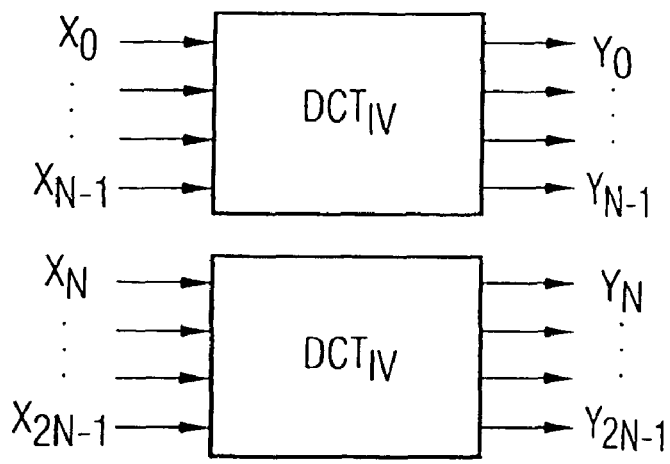
FIG. 12 is an illustration of the transformation of two subsequent blocks of values, as it is useable for the present invention.

The DCT-IV is applied to two blocks of signals at the same time. One possibility for this is illustrated in FIG. 12, where, for example, two temporally successive blocks of samples are simply subjected to a DCT-IV. The two blocks which are subjected to the two transforms may, however, also be samples of two channels of a multichannel signal.

The decomposition from the multidimensional lifting equation described above is applied to the transform rule which may also be considered as N×N matrix. As the inverse, particularly for the DCT-IV, is again the DCT-IV, the result is the following decomposition for the concept shown in FIG. 12:

$$\begin{pmatrix} DCT_{IV} & 0 \\ 0 & DCT_{IV} \end{pmatrix} = \begin{pmatrix} -E_N & 0 \\ DCT_{IV} & E_N \end{pmatrix} \begin{pmatrix} E_N & -DCT_{IV} \\ 0 & E_N \end{pmatrix} \begin{pmatrix} 0 & E_N \\ E_N & DCT_{IV} \end{pmatrix}$$

The permutations of the multiplications by −1 may be extracted into distinct block matrices, so that the result is the following:

$$\begin{pmatrix} DCT_{IV} & 0 \\ 0 & DCT_{IV} \end{pmatrix} =$$
$$\begin{pmatrix} -E_N & 0 \\ 0 & E_N \end{pmatrix} \begin{pmatrix} E_N & 0 \\ DCT_{IV} & E_N \end{pmatrix} \begin{pmatrix} E_N & -DCT_{IV} \\ 0 & E_N \end{pmatrix} \begin{pmatrix} E_N & 0 \\ DCT_{IV} & E_N \end{pmatrix} \begin{pmatrix} 0 & E_N \\ E_N & 0 \end{pmatrix}$$

Thus, the application of a transform to two blocks of signals, i.e. to two blocks of discrete values, may be obtained with preferably three multidimensional lifting steps:

$$\begin{pmatrix} E_N & 0 \\ DCT_{IV} & E_N \end{pmatrix} \begin{pmatrix} E_N & -DCT_{IV} \\ 0 & E_N \end{pmatrix} \begin{pmatrix} E_N & 0 \\ DCT_{IV} & E_N \end{pmatrix}$$

The above equation is graphically illustrated in FIG. 10c based on an embodiment. The inverse converting is correspondingly illustrated in FIG. 11, as discussed.

With the approach, two DCT-IV transforms of the length N may be implemented in an invertible manner, wherein only 3N rounding steps are required, i.e. 3N/2 rounding steps per transform.

The DCT-IV in the three multidimensional lifting steps may have any implementation, i.e., for example, a floating point based or a fixed point based implementation. It does not even have to be invertible. It only has to be performed in exactly the same way in the forward and in the backward process. As a result, this concept is suitable for high transform lengths, such as 1,024, as they are used in current audio coding applications.

The overall computing complexity is equal to 1.5 times the computing complexity of the non-integral implementation of the two DCT-IV transforms. This computing complexity is still significantly lower than for conventional lifting-based integral implementations which are about twice as complex as the conventional DCT-IV, because these implementations have to use the trivial plus/minus butterflies based on the used lifting scheme to achieve energy conservation, as described in R. Geiger, T. Sporer, J. Koller and K. Brandenburg, "Audio Coding based on Integer Transforms" in 111th AES Convention, New York, 2001.

The illustrated approach will calculate at least two DCT-IV transforms at the same time, so to speak, i.e. within one conversion. This may be achieved, for example, by calculating the DCT-IV transform for two successive blocks of the audio signal or two successive images of an image signal. In the case of a two-channel stereo signal, this may also be achieved by calculating the DCT-IV of the left and the right channel in a conversion action and/or inverse conversion action. The first version introduces an additional delay of one block into the system. The second version is possible for stereo channels and/or, generally speaking, for multi-channel signals.

Figure 15:
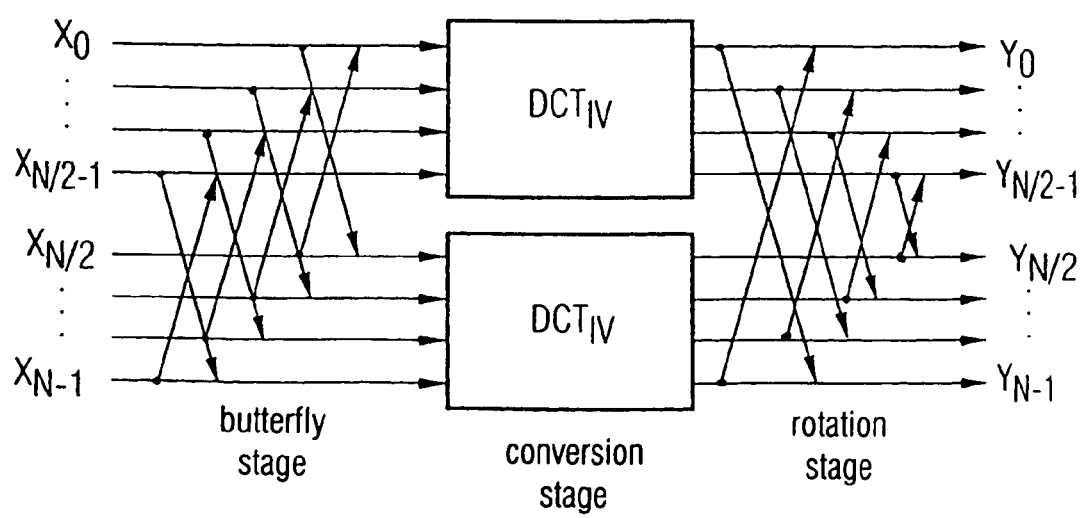
FIG. 15 is an illustration of the present invention for the decomposition of a DCT-IV of the length N into two DCT-IVs of the length N/2.

Alternatively, if both options are not desired, but if a normal block processing length of N values is to be maintained, the DCT-IV of the length N may also be decomposed into two DCT-IV transforms of the length N/2. In this context, see Y. Zeng, G. Bi and Z. Lin, "Integer sinusoidal transforms based on lifting factorization", in Proc. ICASSP'01, May 2001, pp. 1.181-1.184, where this decomposition is discussed. In addition to the two DCT transforms of the length N/2, several additional stages of Givens rotations are required. In this algorithm, there is further applied a block matrix $$\begin{pmatrix} E_{N/2} & -E_{N/2} \\ E_{N/2} & E_{N/2} \end{pmatrix},$$

i.e. N/2 plus/minus butterflies, a block diagonal matrix with N/2 Givens rotations and further some permutation matrices. Using these additional stages of N/2 Givens rotations, the multidimensional lifting approach may also be used for the calculation of only one DCT-IV of the length N. The basic structure of this algorithm is illustrated in FIG. 15, where, besides the actual conversion stage, in which two DCT-IV transforms with the length of N/2 are used, there is first a butterfly stage to calculate the first and the second block of discrete values which, however, now only have a length of N/2. There is further provided a rotation stage on the output side to obtain the output values $y_0, \ldots, y_{N-1}$ from the block of output values of the transformed representation and the further block of output values of the transformed representation, which, however, now only have N/2 values each, wherein the former are equal to the output values of a DCT-IV operation of FIG. 12, as becomes apparent in a comparison of the indices on the input side and on the output side of FIG. 15 and FIG. 12.

Up to now, there was only discussed the application of the multidimensional lifting to block matrices of the following form.

$$\begin{matrix} T & 0 \\ 0 & T^{-1} \end{matrix}$$

However, it is also possible to decompose other block matrices into multidimensional lifting steps. For example, the following decomposition may be used to implement the combination of a stage with normalized plus/minus butterflies and two blocks of DCT-IV transforms by three steps of the multidimensional lifting:

$$\frac{1}{\sqrt{2}} \begin{pmatrix} E_N & E_N \\ -E_N & E_N \end{pmatrix} \begin{pmatrix} DCT_{IV} & 0 \\ 0 & DCT_{IV} \end{pmatrix} = \begin{pmatrix} \frac{1}{\sqrt{2}} DCT_{IV} & \frac{1}{\sqrt{2}} DCT_{IV} \\ -\frac{1}{\sqrt{2}} DCT_{IV} & \frac{1}{\sqrt{2}} DCT_{IV} \end{pmatrix}$$

$$= \begin{pmatrix} E_N & 0 \\ E_N - \sqrt{2} DCT_{IV} & E_N \end{pmatrix}$$

$$\begin{pmatrix} E_N & \frac{1}{\sqrt{2}} DCT_{IV} \\ 0 & E_N \end{pmatrix}$$

$$\begin{pmatrix} E_N & 0 \\ E_N - \sqrt{2} DCT_{IV} & E_N \end{pmatrix}$$

It becomes apparent from the above equation that the first transform rule, which is used in the left-hand brackets of the above equation, and the second transform rule, which is used in the center brackets of the above equation, and the third transform rule, which is used in the final brackets of the above equation, do not have to be identical. Furthermore, it becomes apparent from the above equation that not only block matrices in which only the main diagonal elements are occupied may be decomposed, but that also fully occupied matrices may be processed. Further it is to be noted that there is no restriction that the transform rules used in converting to a transformed representation have to be identical or even have to have any relation to each other, such that, for example, the second transform rule is the backward transform rule to the first transform rule. Basically, there might also be used three mutually different transform rules, as long as this is taken into account in the inverse representation.

In this context, FIGS. 10*c* and 11 are referred to again. In the conversion of the discrete values to a transformed representation, the means 102 may be formed to implement any transform rule 1. Furthermore, the means 108 may also be formed to use any other or the same transform rule referred to as transform rule 2. The means 140 may further be formed to generally use any transform rule 3 which does not necessarily have to be the same as the first or the second transform rule.

In the inverse conversion of the transformed representation, however, there has to be found an adaptation to the transform rules 1 to 3 discussed in FIG. 10*c*, such that the first means 124 for converting does not execute any transform rule, but the transform rule 3 that was executed in block 140 of FIG. 10*c*. Correspondingly, the means 130 in FIG. 11 has to execute the transform rule 2 which was also executed by the block 108 in FIG. 10*c*. Finally, the means 150 of FIG. 11 has to execute the transform rule 1 which was also executed by the means 102 of FIG. 10*c*, so that a lossless inverse conversion is obtained.

Figure 16:
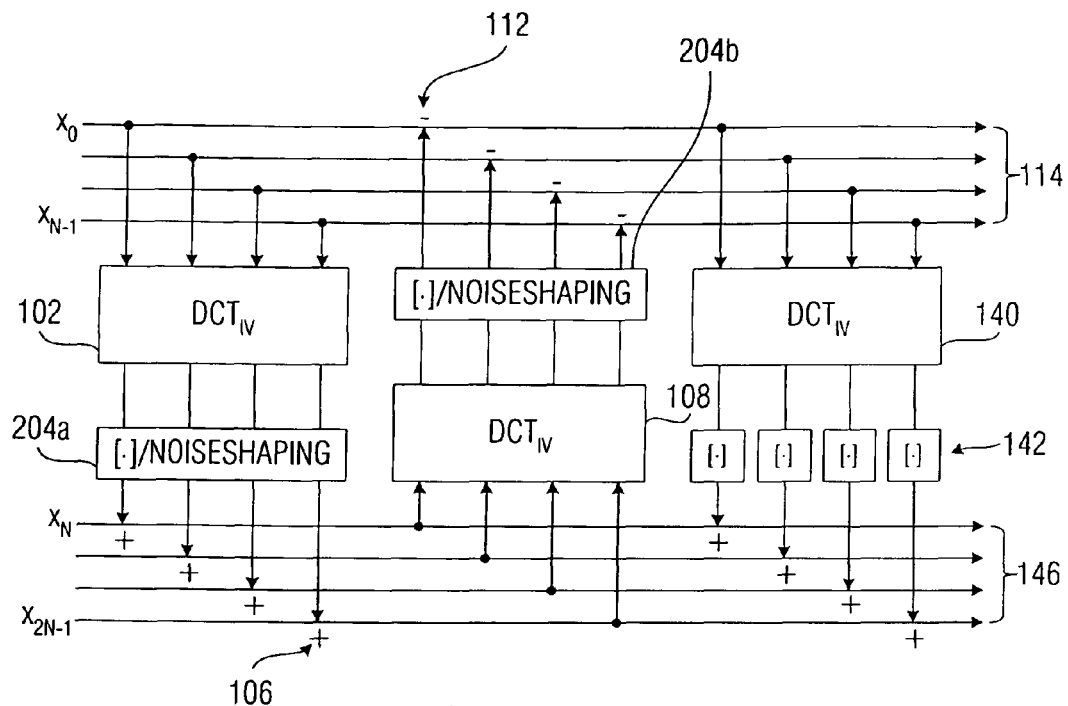
FIG. 16 shows an application of the inventive concept within the transform with multidimensional lifting of FIG. 10.

FIG. 16 shows a modification of the concept described in FIG. 10*c*. In particular, the roundings in the elements 104, 110, 142 for the forward transform or in the elements 126, 132, 152 in the backward transform are no longer executed sample-wise, but such that there is a spectral shaping of the rounding error.

When comparing FIG. 10*c* to FIG. 16, it is apparent that it is preferred to substitute only block 104 by block 204*a*, and to use block 204*b* instead of the rounding block 110. This is the case because the concept is especially advantageous when there is a subsequent transformation into the frequency range where the white noise of the rounding error is problematic when no spectral shaping is performed. Since there is no frequency transformation after the rounding 142, spectral shaping in block 142 would no longer involve the advantage. However, this is the case for the block 204*a*, because there is again a frequency conversion by the transform in block 108. The spectral shaping in block 204*b* is thus also still advantageous, because there is again a transform by the last block 140. However, as is apparent with respect to FIG. 16, the noise-shaped rounding error already enters the output block 114, so that, in block 204*b*, there could also already be performed a common rounding, as illustrated by the blocks 110 in FIG. 10*c*, instead of the spectral shaping of the rounding error.

It depends on the individual case of application whether there will be spectral shaping rounding or common rounding, i.e. with a rounding error having a white spectral distribution, at the end of the second transform, i.e. the transform 108.

The independent rounding of a certain number of, for example, k values is thus replaced by rounding with spectral shaping, which may also be referred to as "dependent rounding".

It becomes apparent from the above discussion with respect to FIG. 16 that the spectral shaping of the rounding error may also be used in the integer DCT required for the IntMDCT. However, it has to be considered here, as discussed, that the spectral shaping by error feedback is only particularly advantageous when the values to be rounded are time signals which are transferred to the frequency domain by a further transform step. Therefore, as illustrated with respect to the multidimensional lifting of FIG. 16, the spectral shaping is advantageous in the first two steps, but is no longer necessarily advantageous in the third step.

It is to be noted that FIG. 16 shows the case in a coder corresponding to FIG. 10*c*. The case in the decoder corresponding to FIG. 16 results directly from a comparison of FIG. 16 and FIG. 11. The decoder directly corresponding to FIG. 16 results from FIG. 11 in that all blocks operate identically, with the exception of the two rounding blocks 132, 152. In FIG. 11, these two rounding blocks operate as independent rounding blocks and would be substituted, in the decoder, by dependent rounding blocks 204*a*, 204*b*, which all have the structure shown with respect to FIG. 2*c*, for example. In particular, it is to be noted that exactly the same spectral shaping rounding algorithm is to be used in the decoder as in the coder.

The concept illustrated in FIGS. 2*b* and 2*c*, particularly for $H(z)=$"−1", is further also especially suitable to achieve an inventive reduction of the rounding error and particularly a reduction of the rounding error in integer transforms.

Figure 17:
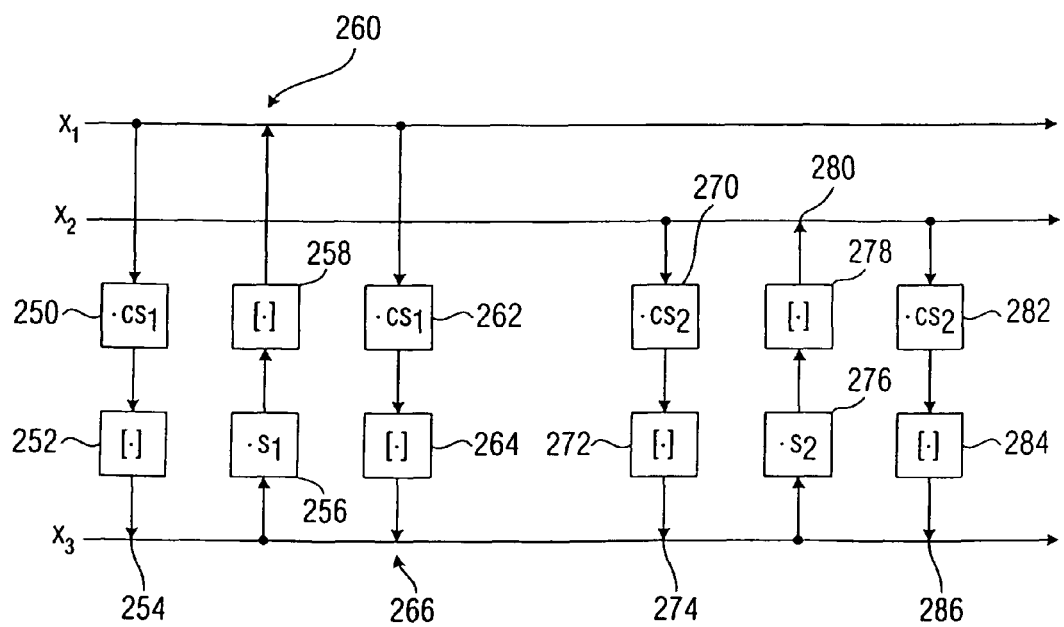
FIG. 17 is an illustration of two successive lifting steps for the inventive rounding error reduction.

According to the invention, such a reduction of the rounding error is possible whenever two floating point values are rounded and added to the same value instead of different values. Such an exemplary situation is illustrated in FIG. 17. Here, there is first a first lifting step with a sequence of down-up-down between the lifting participants $x_1$ and $x_3$. There is further a second lifting sequence with the known sequence of down-up-down, but now with the lifting participants $x_2$ and $x_3$. In particular, the value $x_3$ obtained in the first lifting operation is used to serve as addition partner in the second lifting step, as it is apparent from FIG. 17. It is again to be noted that, when an arrow arrives at a horizontal line, this represents an addition. In other words, a value which has just been rounded is thus added to the value corresponding to the horizontal line.

Specifically, in the example shown in FIG. 17, the value $x_1$ is first weighted (block 250) and then individually rounded (block 252). The output signal of block 252 is added to $x_3$ (block 254). Then, the result of adding 254 is again weighted (block 256) and again rounded (block 258). The result of this rounding 258 is now added to $x_1$ (260). The result of the addition 260 is again weighted (block 262) and rounded (block 264) to be added to the current value of $x_3$ (to block 266). Correspondingly, the value $x_2$ is weighted by a block 270 and is then rounded by a block 272. The result of block 272 is added (274) to the now current value of $x_3$. Then there is again weighting (276) and rounding (278) to add (280) the result of block 278 again to the current value of $x_2$. The result of this addition 280 is again weighted (block 282), and the weighted result is rounded (block 284) to then add the result of the rounding block 284 again to the now current value of $x_3$ (block 286) to obtain a result value for $x_3$. It is apparent from FIG. 17 that first a first value, i.e. the result of block 262, is rounded and then added to $x_3$. In addition, a second value, i.e. the result of block 270, is also rounded (block 272) and then added to the value $x_3$ (adder 274). So there is the situation that two floating point values are rounded one after the other and added to the same value instead of different values. In the example shown in FIG. 17, the result of the third and the fourth lifting step is added to the same value, i.e. $x_3$, so the adding is done with the rounding function [.]:

$$[x_1 \cdot cs_1] + [x_2 \cdot cs_2]$$

If the error of the third lifting step in rounding is fed into the fourth lifting step, the error of the third step may be used in this case and only one rounding error is generated instead of two rounding errors. With respect to calculation, this results from the following:

$$[x_1 \cdot cs_1] + [x_2 \cdot cs_2 + (x_1 \cdot cs_1 - [x_1 \cdot cs_1])] = [x_1 \cdot cs_1] + [x_2 \cdot cs_2 + x_1 \cdot cs_1] - [x_1 \cdot cs_1] = [x_2 \cdot cs_2 + x_1 \cdot cs_1]$$

Figure 18:
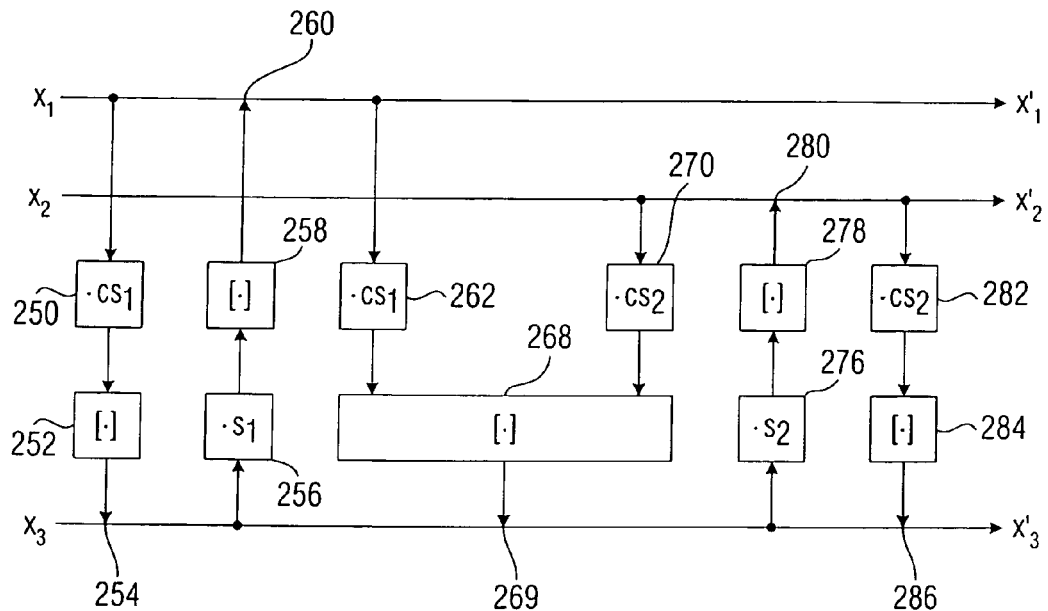
FIG. 18 is an illustration of the inventive concept for reducing the rounding error in two successive lifting steps of FIG. 17.

With respect to calculation, feeding the rounding error into the next rounding step is thus in this case identical to an addition of the values and a subsequent rounding. This situation is illustrated in FIG. 18, wherein FIG. 18 corresponds to FIG. 17, while, however, the two separate rounding blocks 264, 272 and the two separate adders 266, 274 are substituted by a block 268 formed to implement the above equation. Therefore, the results of the two blocks 262 and 270 are first added in unrounded form and then rounded. In favorable cases, the rounding error is thus up to halved. At the output of the block 268, there now results only one single value which is added to $x_3$ by an adder 269.

Figure 19:
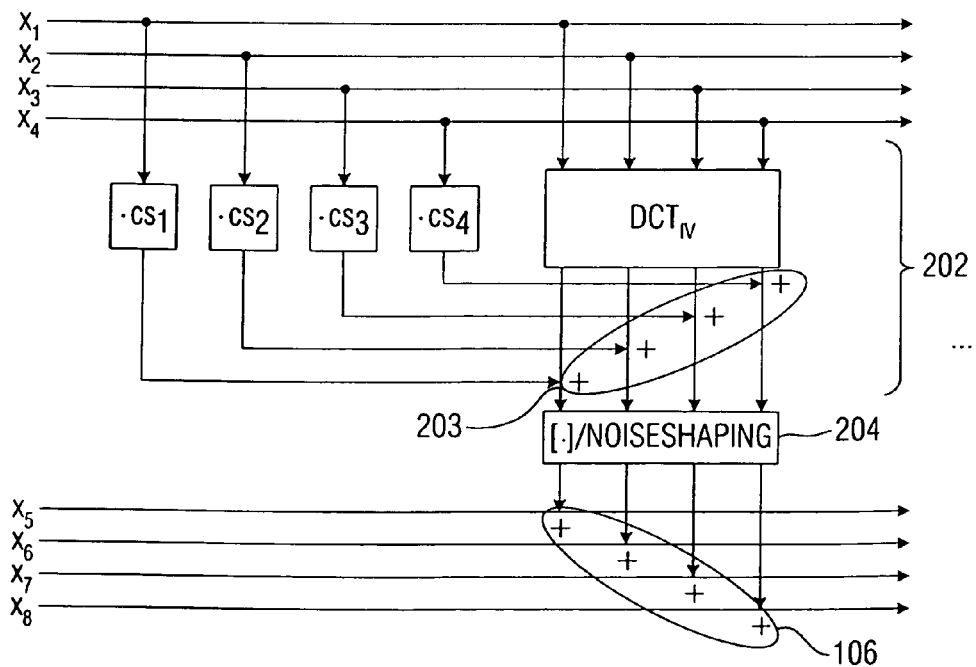
FIG. 19 shows a preferred combination of the concept of FIG. 18 with the concept of FIG. 16.

A combination of reduction and shaping of the rounding error may also occur, for example when a set of Givens rotations and a multidimensional lifting step follow each other, as illustrated in FIG. 19. Here, by way of example only, the last step of a down-up-down sequence for several values is performed of values $x_1$ to $x_4$, i.e., for example, the down step 31c of FIG. 9. These values are now to be added to corresponding values, to which also the rounded values in FIG. 16, i.e. the values at the output of block 204a, are to be added. In this case, it is preferred to add the unrounded values first, namely by the adders 203 shown in FIG. 19, to then round the added values in block 204 in FIG. 19 and simultaneously subject them to noise shaping such that then only a simple rounding error is obtained and the output values after the addition by the adders 106 contain less error. The situation is FIG. 19 thus results when FIG. 9 is put to the left of FIG. 16, and particularly when an N/2 value DCT-IV is used instead of an N value DCT-IV.

According to the invention, it is thus preferred to combine the reduction of the rounding error with the shaping of the rounding error. In the case of the reduction of the rounding error, several input values are thus processed and rounded together, wherein the rounded values are added to one value, while, in the case of the spectral shaping of the rounding error, the rounded values are rounded independently of each other and are added to several respectively different other values.

It is further to be noted that the situation in FIG. 19 may also occur when, as illustrated in FIG. 15, N/2 DCTs are used. Here, prior to the conversion stage, i.e. prior to the two DCT blocks, there exists the stage referred to as butterfly stage in FIG. 15, in which the input values $x_0$ to $x_{N/2-1}$ are correspondingly weighted and rounded to be then added to the same values to which the values of a DCT-IV stage are also added. It is further to be noted that the conversion stage in FIG. 15 is illustrated only schematically. The two DCT-IV blocks illustrated schematically in FIG. 15 would be substituted by the components shown in FIG. 16 in a practical implementation, if, in FIG. 16, $x_{N/2-1}$ is written instead of $x_{N-1}$, and if there is written instead of $x_{N/2}$, and if $x_{N-1}$ is written instead of $x_{N/2-1}$.

Thus FIG. 19 shows a preferred implementation particularly for monoapplications, i.e. for the case in which an N/2 DCT-IV is to be used.

Depending on the circumstances, the inventive method for rounding may be implemented in hardware or in software. The implementation may be done on a digital storage medium, particularly a floppy disk or CD with control signals that may be read out electronically, which may cooperate with a programmable computer system so that the method is performed. Generally, the invention thus also consists in a computer program product with a program code for performing the inventive method stored on a machine-readable carrier, when the computer program product runs on a computer. In other words, the invention is thus also a computer program with a program code for performing the method, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for processing at least two non-integer input values, comprising:
   a unit for providing a first non-integer input value and a second non-integer input value,
   wherein the unit for providing is designed to weight a first original value to obtain the first non-integer input value, and to calculate the second non-integer input value by a first transform rule from a sequence of original values to which the first original value belongs, or to generate the first non-integer input value from a first original value and a third original value by a first lifting step and a second lifting step and a subsequent weighting, and to generate the second non-integer input value by weighting a second original value; and
   a unit for combining the first non-integer input value and the second non-integer input value to obtain a non-integer result value and for rounding the non-integer result value to obtain a rounded result value.

2. The device of claim 1, wherein the unit for combining is designed to form a sum or a difference.

3. The device of claim 1, wherein the first original value and the second original value are discrete values including audio and/or video information.

4. The device of claim 1, further comprising:
   a unit for coupling the rounded result value to a further input value to obtain an output value, the further input value being a result of the first lifting step.

5. The device of claim 4, wherein the unit for coupling is designed as summer or subtracter.

6. The device of claim 4, wherein the further input value is an integer input value so that the output value is also an integer value.

7. The device of claim 1, further designed to add the rounded result value to the third original value modified by the first lifting step and to perform the second lifting step and a third lifting step of a rotation with the third original value modified by the first lifting step and the second original value.

8. The device of claim 1, further including a unit for adding the rounded result value to a further original value which is part of a sequence that has been processed by a first transform rule to obtain a value of a further sequence that is to be processed by a second transform rule, wherein the first transform rule and the second transform rule are transform rules defining a first multi-dimensional lifting step and a second multi-dimensional lifting step.

9. A method for processing at least two non-integer input values using a computer, comprising:

providing a first non-integer input value and a second non-integer input value, wherein the step of providing comprises weighting a first original value to obtain the non-integer input value and calculating the second non-integer input value by a first transform rule from a sequence of original values to which the first original value belongs, or wherein the step of providing comprises generating the first non-integer input value from a first original value and a third original value by a first lifting step and a second lifting step and a subsequent weighting and generating the second non-integer input value by weighting a second original input value;

combining the first non-integer input value and the second non-integer input value to obtain a non-integer result value; and rounding the non-integer result value to obtain a rounded result value.

10. The method of claim 1, wherein, after the step of combining, the following step is performed:

coupling the rounded result value to a third integer input value to obtain an integer output value.

11. A computer readable medium storing a program having a program code for performing the method for processing at least two non-integer input values, the method comprising: providing a first non-integer input value and a second non-integer input value, wherein the step of providing comprises weighting a first original value to obtain the first non-integer input value and calculating the second non-integer input value by a first transform rule from a sequence of original values to which the first original value belongs, or wherein the step of providing comprises generating the first non-integer input value from a first original value and a third original value by a first lifting step and a second lifting step and a subsequent weighting and generating the second non-integer input value by weighting a second original value; and combining the first non-integer input value and the second non-integer input value to obtain a non-integer result value, and rounding the non-integer result value to obtain a rounded result value.

* * * * *

UNITED STATES PATENT AND TRADEMARK OFFICE
CERTIFICATE OF CORRECTION

PATENT NO. : 7,873,227 B2  Page 1 of 1
APPLICATION NO. : 11/386077
DATED : January 18, 2011
INVENTOR(S) : Geiger et al.

It is certified that error appears in the above-identified patent and that said Letters Patent is hereby corrected as shown below:

Column 31, line 22, please replace "The method of claim 1,..." with "The method of claim 9,..."

Signed and Sealed this
Twenty-fourth Day of May, 2011

David J. Kappos
*Director of the United States Patent and Trademark Office*